US010540896B2

United States Patent
Kitano

(10) Patent No.: US 10,540,896 B2
(45) Date of Patent: Jan. 21, 2020

(54) DRIVING ASSISTANCE DEVICE AND DRIVING ASSISTANCE METHOD

(71) Applicant: PIONEER CORPORATION, Tokyo (JP)

(72) Inventor: Kazutoshi Kitano, Kanagawa (JP)

(73) Assignee: PIONEER CORPORATION, Tokyo (JP)

( * ) Notice: Subject to any disclaimer, the term of this patent is extended or adjusted under 35 U.S.C. 154(b) by 45 days.

(21) Appl. No.: 15/545,815

(22) PCT Filed: Jan. 22, 2015

(86) PCT No.: PCT/JP2015/051604
§ 371 (c)(1),
(2) Date: Jul. 24, 2017

(87) PCT Pub. No.: WO2016/117060
PCT Pub. Date: Jul. 28, 2016

(65) Prior Publication Data
US 2018/0018878 A1 Jan. 18, 2018

(51) Int. Cl.
*G08G 1/16* (2006.01)
*G05G 1/02* (2006.01)
(Continued)

(52) U.S. Cl.
CPC ............. *G08G 1/166* (2013.01); *B60R 21/00* (2013.01); *G05D 1/024* (2013.01); *G05D 1/0257* (2013.01);
(Continued)

(58) Field of Classification Search
CPC ...... G08G 1/166; G05D 1/0257; G05D 1/024; G05D 2201/0213
(Continued)

(56) References Cited

U.S. PATENT DOCUMENTS

| 8,841,592 B1* | 9/2014 | Ho | F24J 2/4607 |
| | | | 250/203.4 |
| 2015/0025795 A1* | 1/2015 | Firl | G01C 21/3602 |
| | | | 701/461 |
| 2016/0034771 A1* | 2/2016 | Schamp | G01B 11/2545 |
| | | | 348/148 |

FOREIGN PATENT DOCUMENTS

| JP | 6-36198 | 2/1994 |
| JP | 2006-199055 | 8/2006 |

(Continued)

OTHER PUBLICATIONS

International Search Report, PCT/JP2015/051604, dated Apr. 7, 2015.
(Continued)

*Primary Examiner* — Khoi H Tran
*Assistant Examiner* — Rodney P King
(74) *Attorney, Agent, or Firm* — Young & Thompson

(57) ABSTRACT

An acquisition unit acquires a light path length $r_{ij}$ corresponding to an emission direction of emitted light, which is surrounding information of a moving body obtained by using a laser radar mounted on the moving body, a traffic mirror information including a center position N of a traffic mirror on a map, and position information of the moving body on the map. Then, on the basis of the acquired traffic mirror information and the acquired position information of the moving body on the map, an extraction unit extracts a light path length acquired via the traffic mirror from the acquired light path length $r_{ij}$, and then calculates an object reflection position corresponding to the extracted light path length. This makes it possible to obtain surrounding information in a blind spot for a driver while increasing robustness with respect to the surrounding information, and thus advanced driving assistance can be implemented.

10 Claims, 16 Drawing Sheets

(51) Int. Cl.
    *B60R 21/00*     (2006.01)
    *G05D 1/02*      (2006.01)
(52) U.S. Cl.
    CPC ....... *G08G 1/16* (2013.01); *G05D 2201/0213* (2013.01)
(58) Field of Classification Search
    USPC ........................................................ 701/301
    See application file for complete search history.

(56) References Cited

FOREIGN PATENT DOCUMENTS

| | | | |
|---|---|---|---|
| JP | 2006199055 A | * | 8/2006 |
| JP | 2007-279958 | | 10/2007 |
| JP | 2009-211624 | | 9/2009 |
| JP | 2010-052688 | | 3/2010 |

OTHER PUBLICATIONS

Extended European search report for Application No. 15878755.6, dated Oct. 1, 2018.

* cited by examiner

Fig.1
(A)
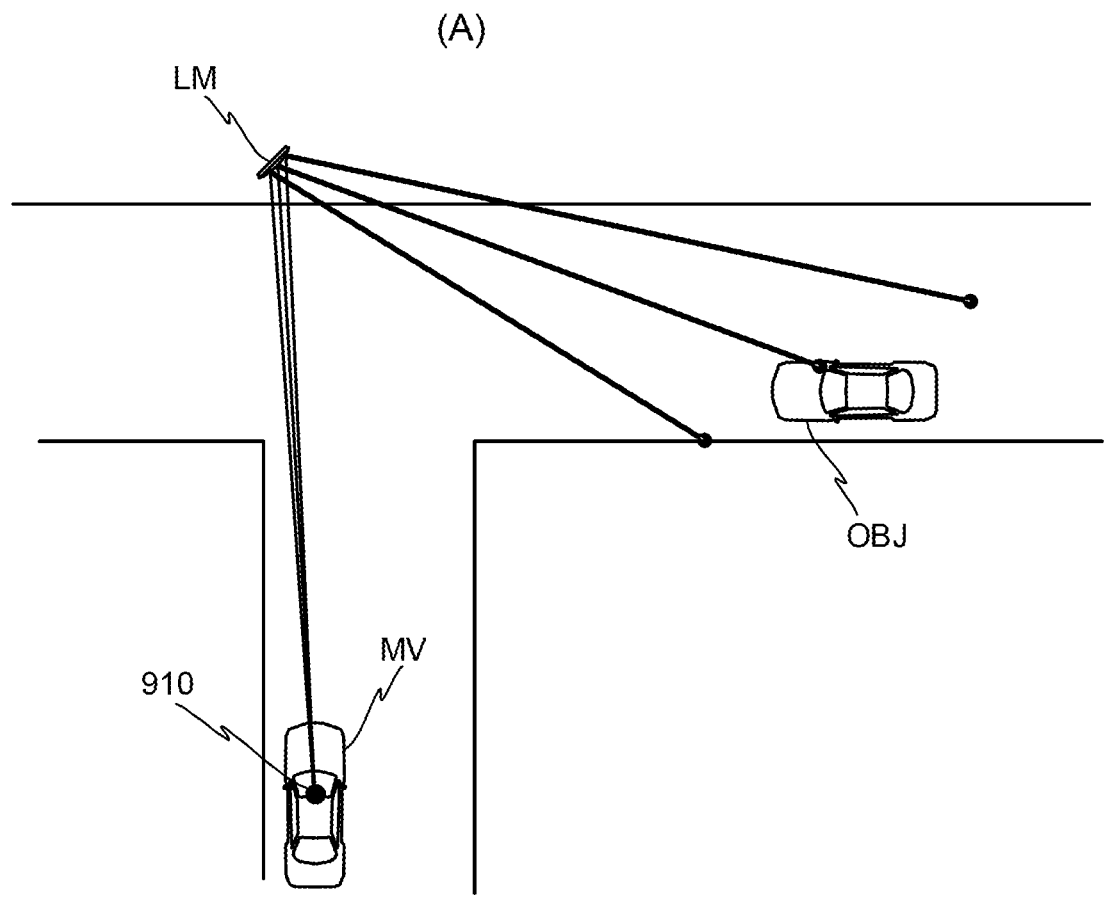
(B)
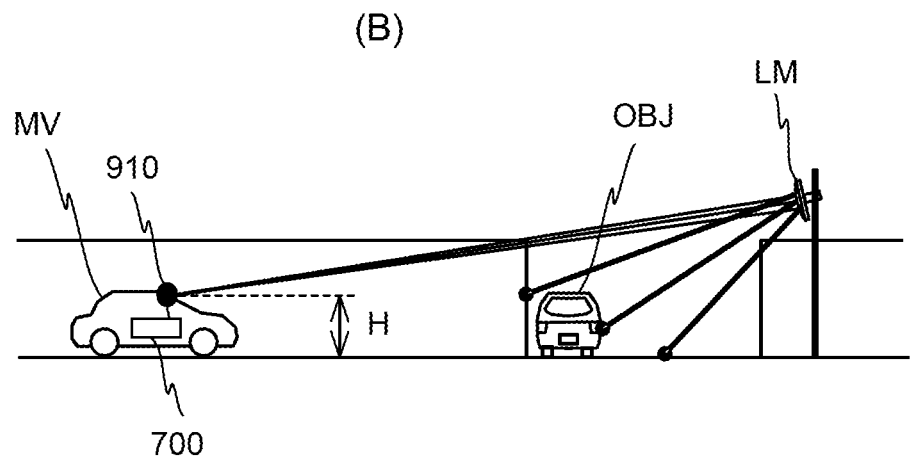

(A)　　　　　　(B)

Fig.6
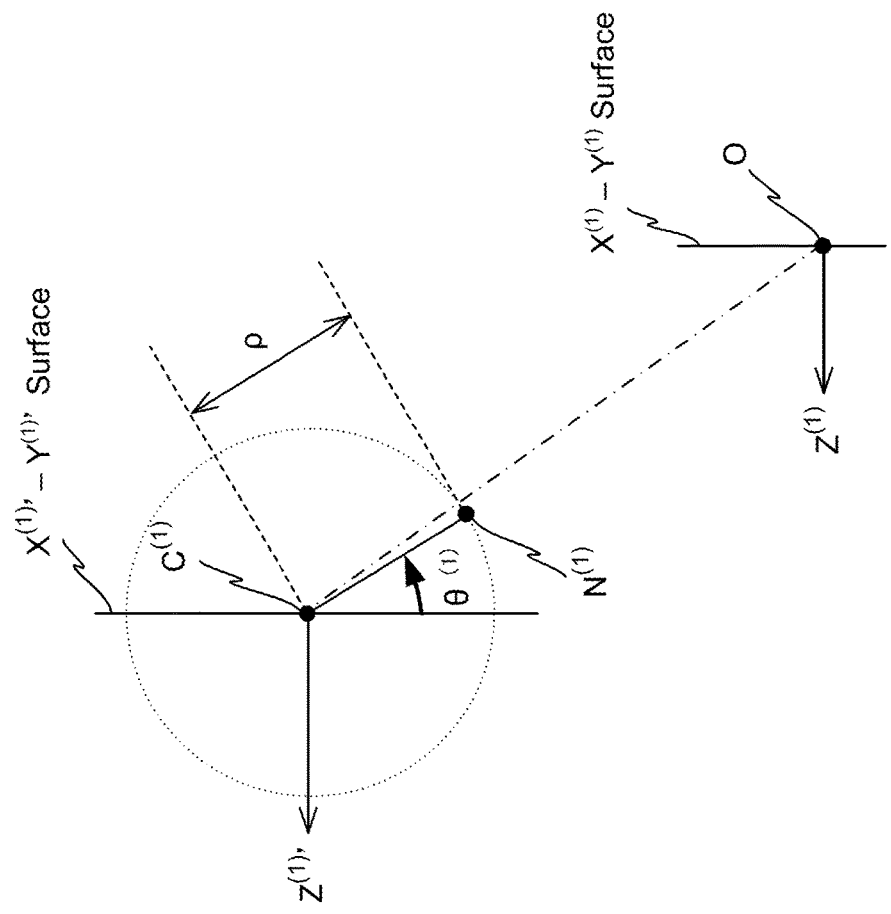
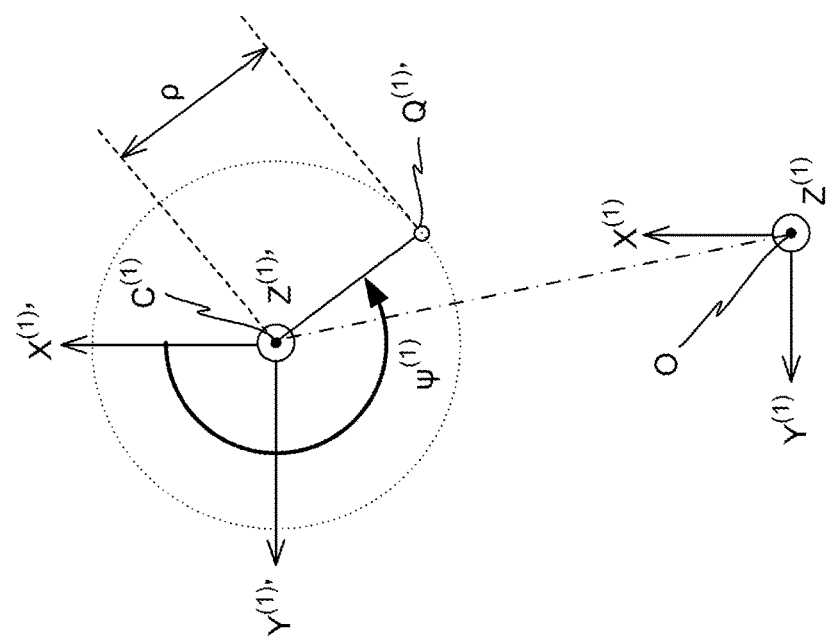

Fig.19
(A)
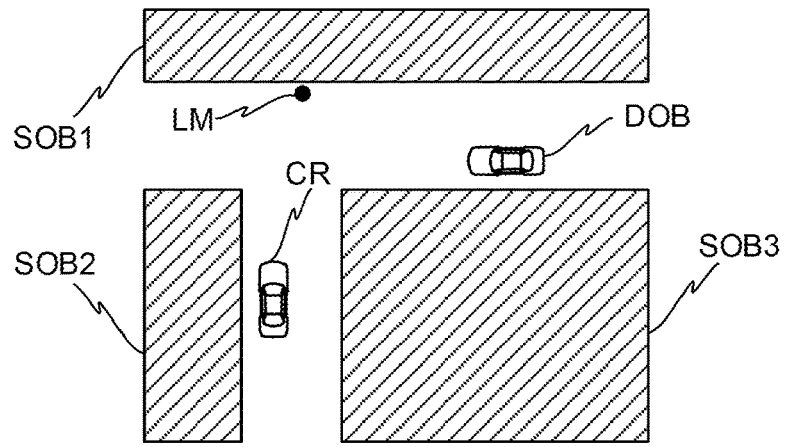
(B)
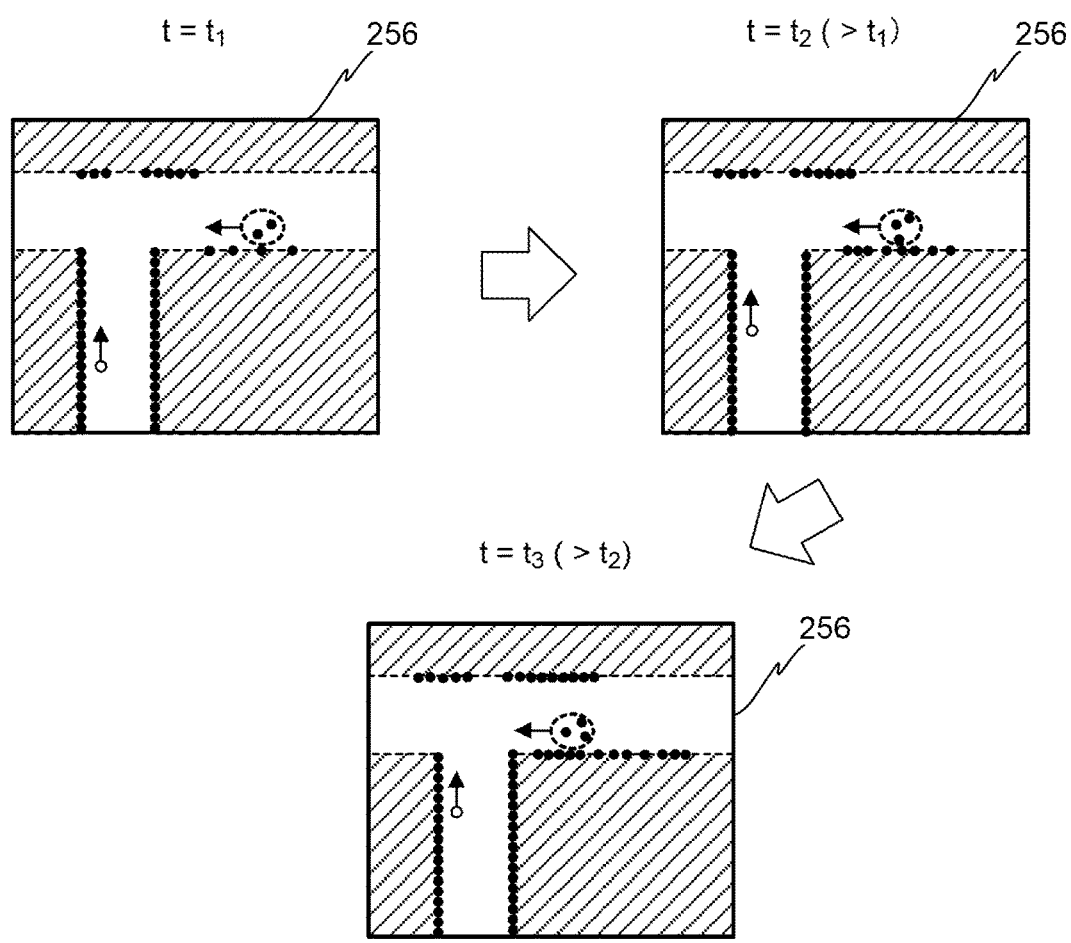

DRIVING ASSISTANCE DEVICE AND DRIVING ASSISTANCE METHOD

TECHNICAL FIELD

The present invention relates to a driving assistance device, to a driving assistance method and a driving assistance program, and to a recording medium upon which such a driving assistance program is recorded.

BACKGROUND ART

In recent years, techniques of various types have been proposed for assisting safe traveling by a moving body such as a vehicle or the like. Among techniques of this sort, there is a technique of evaluating the possibility of collision between a vehicle in a blind spot and the subject vehicle from an image that is reflected in a traffic mirror (refer to Patent Document #1, hereinafter termed "Prior Art Example #1"). With the technique of the Prior Art Example #1, a traffic mirror is recognized according to an image thereof, and a body in a blind spot is detected on the basis of an image of the surroundings reflected in the traffic mirror. And, the possibility is evaluated of a collision between the blind spot body that has been detected and the subject vehicle.

Moreover, there is a technique for determining upon the existence of a traffic mirror in the direction of progression of the subject vehicle (refer to Patent Document #2, hereinafter termed "Prior Art Example #2"), although this is not a technique for evaluating the possibility of a collision between a blind spot body and the vehicle. With the technique of the Prior Art Example #2, irradiating light is emitted in the direction of progression of the subject vehicle. And, a reflected image in the reflected light is captured, and a decision as to the presence of a traffic mirror is performed upon on the basis of the result of image capture.

PRIOR ART DOCUMENTS

Patent Documents

Patent Document #1: Japanese Laid-Open Patent Publication 2006-199055.
Patent Document #2: Japanese Laid-Open Patent Publication 2007-279958.

SUMMARY OF INVENTION

Problems to be Solved by the Invention

With the technique of the Prior Art Example #1 described above, it is premised that photography is performed under ambient light conditions. Due to this, the robustness is low with respect to changes of the surrounding environment between daytime and night-time.

Moreover, with the technique of the Prior Art Example #2 described above, only the existence of a traffic mirror in the direction of progression of the subject vehicle is determined upon. As a result, advanced driving assistance such as evaluating the possibility of a collision between a body in a blind spot and the subject vehicle continues to be left to the driver.

Due to this, there is a requirement for a technique that uses a traffic mirror and that is highly robust against change of the surrounding environment, and that moreover makes it possible to provide advanced driving assistance. One of the problems to be solved is to respond to this requirement.

Means for Solving the Problems

When viewed from the first standpoint, the present invention is a driving assistance device comprising: a first acquisition unit that acquires information about the surroundings of a moving body, acquired by using a laser radar mounted to the moving body; a second acquisition unit that acquires traffic mirror information that includes position information for a traffic mirror; a third acquisition unit that acquires position information for said moving body; and an extraction unit that, on the basis of the results of acquisition by using said second acquisition unit and by using said third acquisition unit, extracts information about the surroundings acquired via said traffic mirror from among the results of acquisition by using said first acquisition unit.

And, when viewed from the second standpoint, the present invention is a driving assistance method utilized by a driving assistance device that uses a laser radar mounted to a moving body, and that assists traveling of said moving body, comprising the steps of: acquiring information about the surroundings of said moving body acquired by using said laser radar, traffic mirror information that includes position information for a traffic mirror, and position information for said moving body; and extracting information about the surroundings acquired via said traffic mirror from among information about the surroundings of said moving body acquired by said acquiring step, on the basis of said traffic mirror information and said position information for said moving body acquired by said acquiring step.

Furthermore, when viewed from the third standpoint, the present invention is a non-transient computer readable medium having recorded therein a driving assistance program that, when executed, causes a calculation part to execute the driving assistance method according to the present invention.

And, when viewed from the fourth standpoint, the present invention is a driving assistance device comprising: a first acquisition unit that acquires information about the surroundings of a moving body, acquired by using a laser radar mounted to the moving body; a second acquisition unit that acquires traffic mirror information that includes position information for a traffic mirror; a third acquisition unit that acquires position information for said moving body; and a calculation unit that, on the basis of the results of acquisition by using said first to third acquisition units, calculates information of a position of an object irradiated by light, the light being emitted from said laser radar and being reflected by said traffic mirror.

BRIEF DESCRIPTION OF THE DRAWINGS

FIG. 1 is a figure for explanation of the position in which a driving assistance device according to an embodiment of the present invention is disposed;

FIG. 6 is the second figure for explanation of the azimuth angle of installation and the depression angle of installation of the traffic mirror;

FIG. 19 is a figure showing examples of display of normal presentation information.

REFERENCE SIGNS LIST

Figure 2:
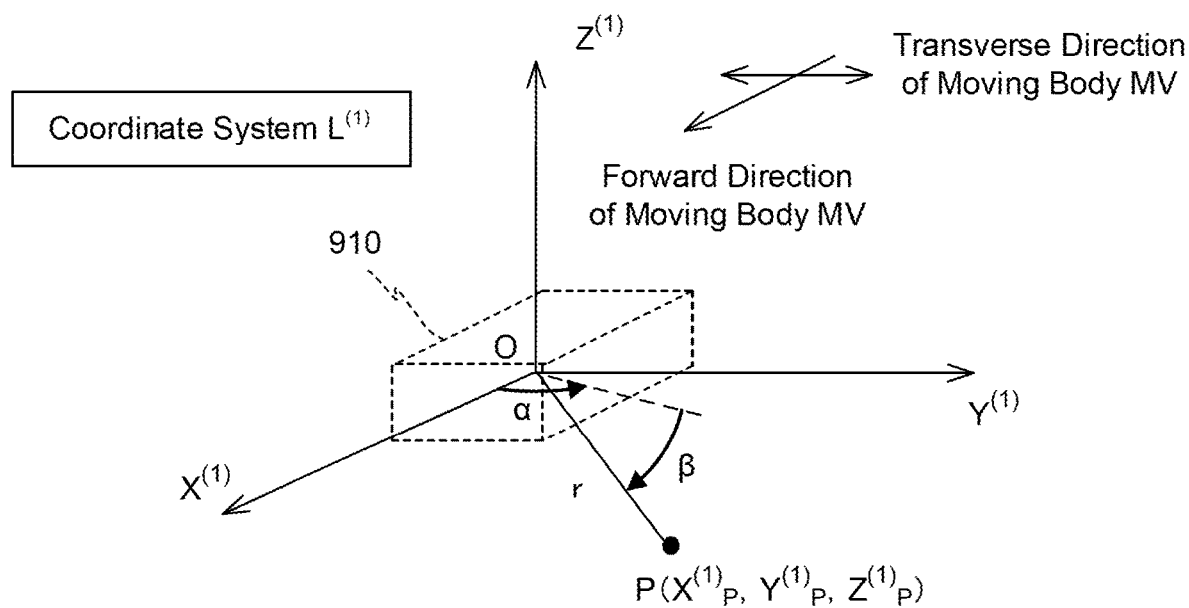
FIG. 2 is a figure for explanation of a laser radar coordinate system $L^{(1)}$.
Figure 3:
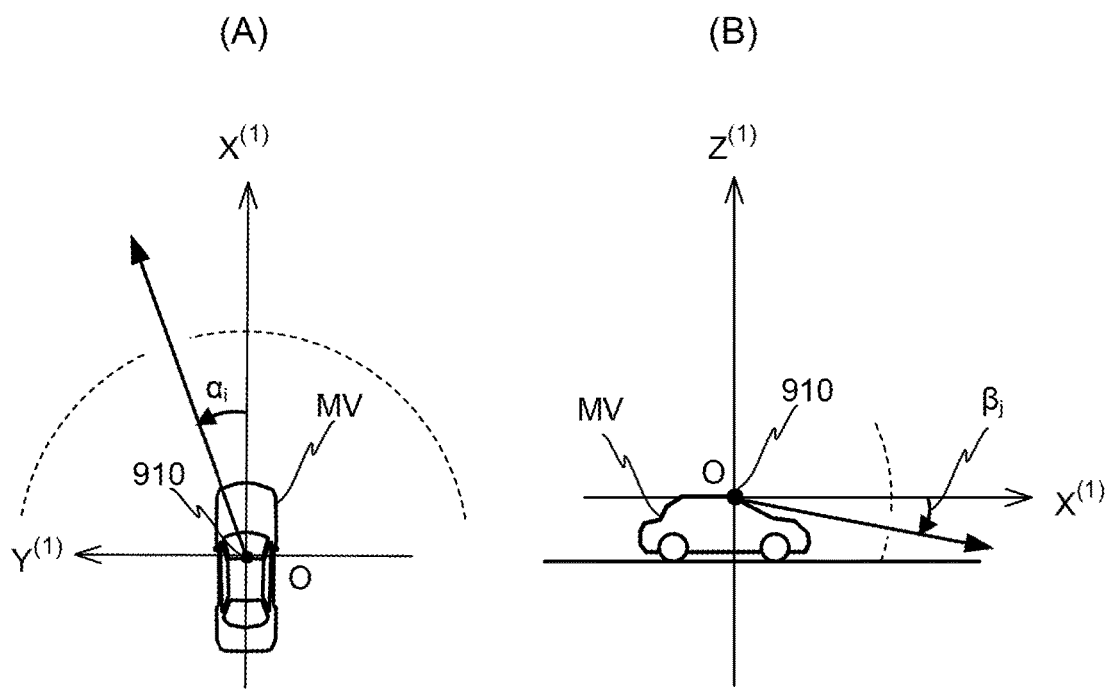
FIG. 3 is a figure for explanation of the direction of emission of light emitted from the laser radar.

100 . . . driving assistance device
110 . . . processing unit (first through fourth acquisition units, extraction unit, and recognition unit)
700 . . . driving assistance device
720 . . . acquisition unit (first through fourth acquisition units)
730 . . . extraction unit
740 . . . recognition unit

EMBODIMENT FOR CARRYING OUT THE INVENTION

In the following, an embodiment of the present invention will now be explained with reference to FIGS. 1 through 11. Note that, in the following explanation and drawings, the same reference signs are appended to elements that are the same or equivalent, and duplicated explanation will be omitted.

As shown in FIG. 1, the driving assistance device 700 according to the embodiment is arranged in a moving body MV such as a vehicle or the like that travels along a road. And the driving assistance device 700 detects one or more obstructing objects OBJ present in a blind spot by using a laser radar 910 (also termed a "LiDAR", a "laser scanner", or a "laser rangefinder") and a traffic mirror LM (which is a curved mirror).

Note that in FIG. 1(A) a view from above the moving body MV is shown, while in FIG. 1(B) a view from the left side of the moving body MV is shown.

Here, the laser radar 910 is mounted upon the moving body MV and emits a laser beam to the exterior thereof; and the laser radar 910 measures the optical path length traced from the laser radar 910 to the object on the basis of the time period from the time point of emission of the laser beam to its time point of arrival back at the laser radar 910 after reflected by the object and returned back along the path from the laser radar 910 to the object. Note that, in the embodiment, it is arranged to dispose the laser radar 910 at a position in which its height from the surface of the road is "H".

Furthermore, the traffic mirror LM is a spherical mirror that reflects incident light. The traffic mirror LM is installed on a road that goes around a curve or at a road intersection, so that it is possible to see around a corner, by visual inspection, into a blind spot caused by the presence of a building or the like. As a result, as generally shown in FIGS. 1(A) and 1(B), the laser beams emitted from the laser radar 910 come to reach the region which is a blind spot from the point of view of the driver of the moving body MV.

[The Theory of Detection of an Obstacle Present in a Blind Spot]

First, the theory according to the embodiment of detection of an obstacle present in a blind spot (hereinafter termed a "blind spot obstacle") will be explained.

(1) The Laser Radar Coordinate System $L^{(1)}$

A laser radar coordinate system $L^{(1)}$ (hereinafter referred to as the "coordinate system $L^{(1)}$") is defined as being a coordinate system that is intrinsic to the laser radar 910. In the coordinate system $L^{(1)}$, as shown in FIG. 2, the central position of the laser radar 910 is taken as the origin O, and the forward direction upon the moving body MV is taken as being the $X^{(1)}$ direction.

Moreover, in the coordinate system $L^{(1)}$, the horizontal direction orthogonal to the forward direction of the moving body MV on the left is taken as being the $Y^{(1)}$ direction, while the upward direction orthogonal to the $X^{(1)}$ direction and to the $Y^{(1)}$ direction is taken as being the $Z^{(1)}$ direction.

In the coordinate system $L^{(1)}$, the values of the coordinates $(X^{(1)}_P, Y^{(1)}_P, Z^{(1)}_P)$ of a position P are determined by the distance r from the origin O to the position P, its azimuth angle $\alpha$, and its depression angle $\beta$, and are given therefrom by the following Equations (1) through (3):

$$X^{(1)}P = r \cdot \cos\alpha \cdot \cos\beta \tag{1}$$

$$Y^{(1)}P = r \cdot \sin\alpha \cdot \cos\beta \tag{2}$$

$$Z^{(1)}P = -r \cdot \sin\beta \tag{3}$$

Note that the map coordinate system $L^{(0)}$ of the embodiment that is used for defining the position upon the Earth is defined by using a rectangular plane coordinate system or the like, such as values of the coordinates (X,Y) and an altitude value (Z). Then, if the current position of the moving body MV in the map coordinate system $L^{(0)}$ and the tilt direction and the tilt angle of the road at the current position of the mobile body MV are known, it is possible to perform mutual coordinate conversion between the map coordinate system $L^{(0)}$ and the coordinate system $L^{(1)}$.

(2) The Direction of Emission of the Laser Beam

The emission azimuth angle and the emission depression angle in the coordinate system $L^{(1)}$ of the laser beam emitted from the laser radar 910 (hereinafter also referred to as the "emitted beam") are shown in FIGS. 3(A) and 3(B).

As shown in FIG. 3(A), the emission azimuth angle $\alpha_i$ of the emitted beam (where $i = n_{MIN}, \ldots, 0, \ldots, n_{MAX}$) is given by the following Equation (4), with the change step angle taken as being $\Delta\alpha$:

$$\alpha_i = i \cdot \Delta\alpha \tag{4}$$

Note that, in the embodiment, a change step angle $\Delta\alpha=0.9°$, a constant $n_{MIN}=-1999$, and a constant $n_{MAX}=2000$ may be employed.

Furthermore, as shown in FIG. 3(B), the emission depression angle $\beta_j$ of the emitted beam (where $j=m_{MIN}, \ldots, 0, \ldots, m_{MAX}$) is given by the following Equation (5), with the change step angle taken as being $\Delta\beta$:

$$\beta_j = j \cdot \Delta\beta \quad (5)$$

Note that, in the embodiment, a change step angle $\Delta\beta=0.42°$, a constant $m_{MIN}=-31$, and a constant $m_{MAX}=32$ may be employed.

(3) The Optical Path from the Laser Radar 910 to the Blind Spot Obstacle

Figure 4:
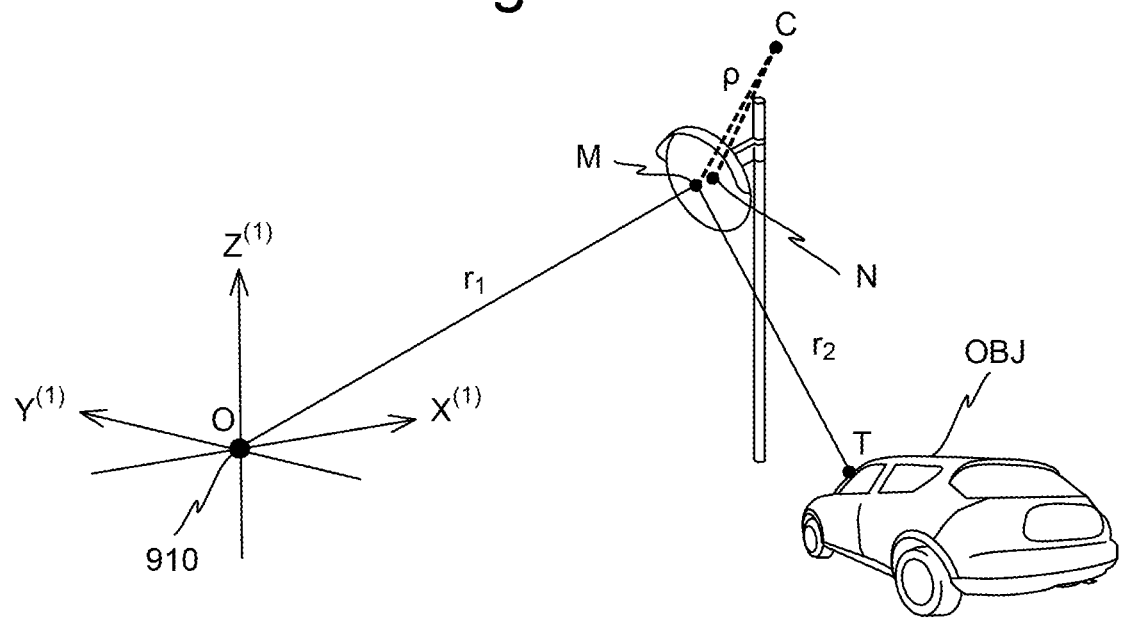
FIG. 4 is a figure for explanation of the optical path of light emitted via the traffic mirror.

The optical path of the emitted beam emitted from the laser radar 910 that is reflected by the position M upon the traffic mirror LM (hereinafter this will be termed the "on-mirror reflection position M") and the optical path of that emitted beam when it has arrived at the reflection position T upon the obstructing object OBJ (hereinafter this will be termed the "on-object reflection position T") are shown in FIG. 4. And the emitted beam that has arrived at the on-object reflection position T upon the obstructing object OBJ by following the optical path is subjected to diffused reflection or the like. Then, a portion of the emitted beam that has been subjected to diffused reflection or the like retraces that optical path in the opposite direction and returns back to the laser radar 910.

The laser radar 910 measures the length r of the optical path traced from the laser radar 910 to the obstructing object OBJ on the basis of the time period from the time point of emission of the emitted and returned beam to the time point of its arrival. Here, the optical path length r is calculated as the sum of the distance $r_1$ from the laser radar 910 to the on-mirror reflection position M upon the traffic mirror LM and the distance $r_2$ from that on-mirror reflection position M to the on-object reflection position T upon the obstructing object OBJ. Moreover, the on-object reflection position T lies upon the plane determined by a straight line that connects the center position of the laser radar 910 (hereinafter termed the "origin O") and the on-mirror reflection position M, and a straight line that connects the center of curvature C of the traffic mirror LM and the on-mirror reflection position M.

Note that the position where diffused reflection or the like takes place is not limited to being a position upon the obstacle itself; in some cases, it may be a position upon the road surface. Moreover in some cases the obstacle from which diffused reflection or the like takes place is a building or the like that is registered in the map information, while in some cases it is an object that is not registered in the map information. Yet further, in some cases the obstacle is a static obstacle which is static, and in some cases it is a moving obstacle which is moving.

(4) The Traffic Mirror LM

As shown in FIG. 4, the traffic mirror LM is a spherical mirror having a center of curvature C, a radius of curvature $\rho$, and a center position N. Here, the center position N is already known, and information that specifies it can be registered in advance as a coordinate position in the map coordinate system $L^{(0)}$. If the values of the coordinates $(X^{(0)}_N, Y^{(0)}_N, Z^{(0)}_N)$ of the center position N in the map coordinate system $L^{(0)}$ are thus registered in advance, then it is possible to calculate the center position N of the traffic mirror LM in the coordinate system $L^{(1)}$ by referring to the registered information. Note that the mirror diameter D of the traffic mirror LM is an already known physical quantity, and is information that can be registered in advance.

In the following, it will be supposed that the values of the coordinates of the center position N in the coordinate system $L^{(1)}$ are written as $(X^{(1)}_N, Y^{(1)}_N, Z^{(1)}_N)$. Moreover, it will also be supposed that an arbitrary position F in the coordinate system $L^{(q)}$ is written as "position $F^{(q)}$".

Figure 5:
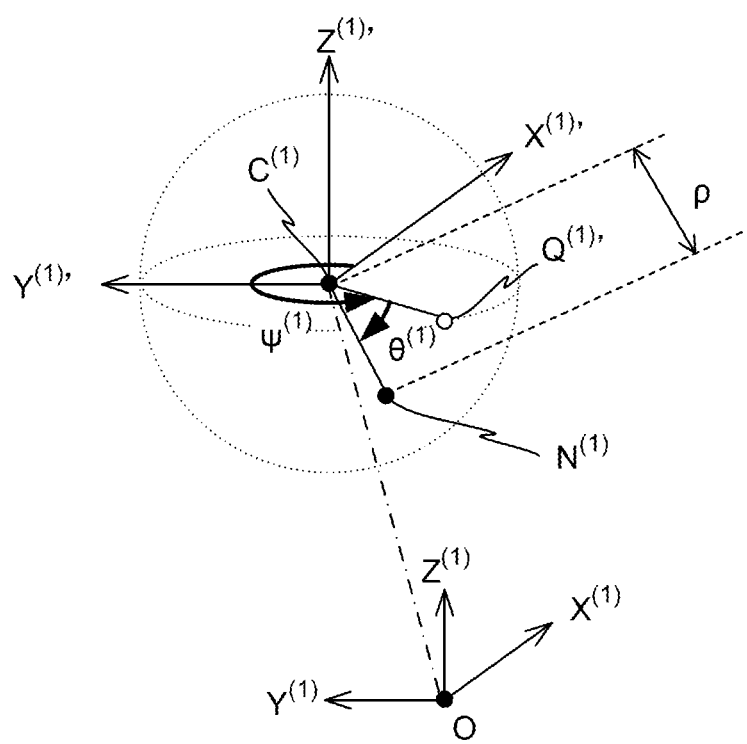
FIG. 5 is the first figure for explanation of an azimuth angle of installation and a depression angle of installation of the traffic mirror.

The azimuth angle of installation $\psi^{(1)}$ and the depression angle of installation $\theta^{(1)}$ of the traffic mirror LM in the coordinate system $L^{(1)}$ in the case of the embodiment are shown in FIG. 5. When defining the azimuth angle of installation $\psi^{(1)}$ and the depression angle of installation $\theta^{(1)}$, a coordinate system $L^{(1)\prime}$ is established in which the center of curvature $C^{(1)}$ is taken as the origin, and which is defined by an $X^{(1)\prime}$ axis that is parallel to the $X^{(1)}$ axis, a $Y^{(1)\prime}$ axis that is parallel to the $Y^{(1)}$ axis, and a $Z^{(1)\prime}$ axis that is parallel to the $Z^{(1)}$ axis. And, the azimuth angle of installation $\psi^{(1)}$ and the depression angle of installation $\theta^{(1)}$ of the traffic mirror LM in the coordinate system $L^{(1)\prime}$ are defined as being the angles $\psi^{(1)}$ and $\theta^{(1)}$ that appear when the values of the coordinates $(X^{(1)\prime}_N, Y^{(1)\prime}_N, Z^{(1)\prime}_N)$ of the center position $N^{(1)}$ in the coordinate system $L^{(1)\prime}$ are expressed in polar coordinate format, as in the following Equations (6) through (8):

$$X^{(1)\prime}_N = \rho \cdot \cos\psi^{(1)} \cdot \cos\theta^{(1)} \quad (6)$$

$$Y^{(1)\prime}_N = \rho \cdot \sin\psi^{(1)} \cdot \cos\theta^{(1)} \quad (7)$$

$$Z^{(1)\prime}_N = -\rho \cdot \sin\theta^{(1)} \quad (8)$$

Note that the position $Q^{(1)\prime}$ in FIG. 5 is the position of the values of the coordinates $(X^{(1)\prime}_N, Y^{(1)\prime}_N, 0)$ in the coordinate system $L^{(1)\prime}$.

In other words, as shown in FIG. 6(A), the azimuth angle of installation $\psi^{(1)}$ is defined as being the angle subtended on the plane $(X^{(1)\prime}_N - Y^{(1)\prime}_N)$ by the axis $X^{(1)\prime}$ and the line segment that connects the center of curvature $C^{(1)}$ and the position $Q^{(1)\prime}$. Moreover, as shown in FIG. 6(B), the depression angle of installation $\theta^{(1)}$ is defined as being the angle obtained by subtracting 90° from the angle subtended on the plane that includes the $Z^{(1)\prime}$ axis and the center position $N^{(1)}$ by the $Z^{(1)\prime}$ axis and the line segment that connects the center of curvature $C^{(1)}$ and the center position $N^{(1)}$.

By the way, the azimuth angle of installation $\psi^{(0)}$ and the depression angle of installation $\theta^{(0)}$ of the traffic mirror LM in the map coordinate system $L^{(0)}$ are physical quantities that are already known, and are information that can be registered in advance.

Thus, if the azimuth angle of installation $\psi^{(0)}$ and the depression angle of installation $\theta^{(0)}$ of the traffic mirror LM in the map coordinate system $L^{(0)}$ are thus registered, then, by referring to the registered information, it is possible to calculate the azimuth angle of installation $\psi^{(1)}$ and the depression angle of installation $\theta^{(1)}$ of the traffic mirror LM in the coordinate system $L^{(1)}$ shown in FIGS. 5 and 6.

In the following, the center position $N^{(0)}$, the radius of curvature $\rho$, and the diameter D of the traffic mirror LM, and its azimuth angle of installation $\psi^{(0)}$ and its depression angle of installation $\theta^{(0)}$ will be termed the "traffic mirror information".

Note that the values of the coordinates $(X^{(1)}_C, Y^{(1)}_C, Z^{(1)}_C)$ of the center of curvature C in the coordinate system $L^{(1)}$ shown in FIGS. 4 through 6 may be calculated on the basis of the center position $N^{(1)}$ $(X^{(1)}_N, Y^{(1)}_N, Z^{(1)}_N)$, the azimuth angle of installation $\psi^{(1)}$, and the depression angle of installation $\theta^{(1)}$ by using the following Equations (9) through (11):

$$X^{(1)}{}_C = X^{(1)}{}_N - \rho \cdot \cos\theta^{(1)} \cdot \cos\psi^{(1)} \qquad (9)$$

$$Y^{(1)}{}_C = Y^{(1)}{}_N - \rho \cdot \cos\theta^{(1)} \cdot \sin\psi^{(1)} \qquad (10)$$

$$Z^{(1)}{}_C = Z^{(1)}{}_N + \rho \cdot \sin\theta^{(1)} \qquad (11)$$

(5) The Calculation of the On-Object Reflection Position T

As described above, the on-object reflection position T lies upon the plane that is defined by the straight line connecting the position of the laser radar 910 (hereinafter termed the "origin O") and the on-mirror reflection position M, and by the straight line connecting the center of curvature C and the on-mirror reflection position M. Thus, in that plane, a coordinate system $L^{(4)}$ is defined in which, along with the origin O being taken as the origin, the direction toward the on-mirror reflection position M is taken as the $X^{(4)}$ direction, and the direction orthogonal to that $X^{(4)}$ direction and parallel to that plane is taken as the $Y^{(4)}$ direction.

Figure 7:
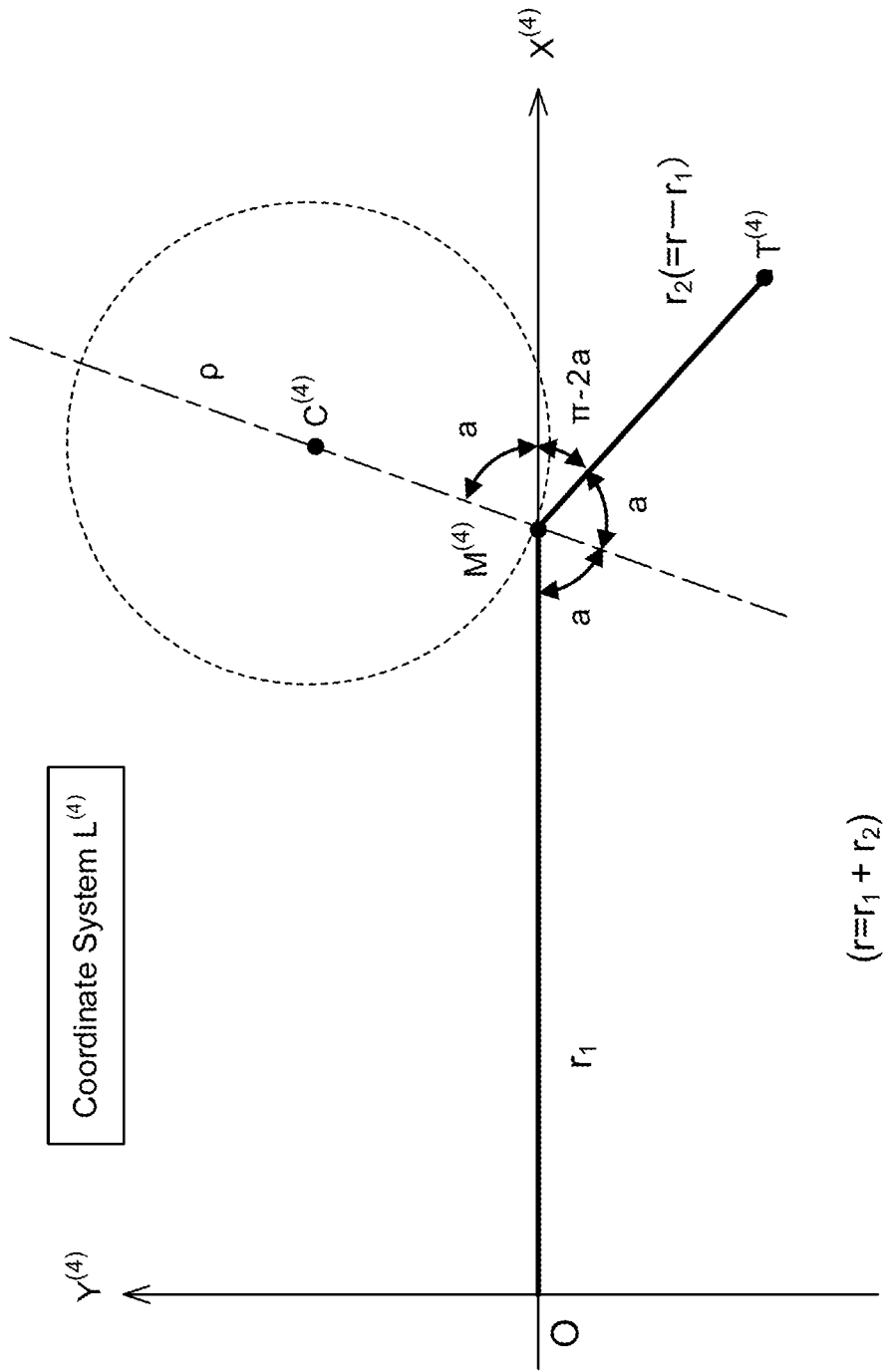
FIG. 7 is a figure for explanation of a method for calculating a position derived via the traffic mirror.

When the coordinate system $L^{(4)}$ is used, the center of curvature $C^{(4)}$, the on-mirror reflection position $M^{(4)}$, and the on-object reflection position $T^{(4)}$ appear as shown in FIG. 7. This is because, in the neighborhood of the on-mirror reflection position $M^{(4)}$, light that is incident upon the traffic mirror LM is reflected at an angle of incidence that is symmetrical with respect to the direction of the normal at the on-mirror reflection position $M^{(4)}$.

Note that, in FIG. 7, with respect to the direction of the normal at the origin shown by the straight line that passes through the center of curvature $C^{(4)}$ and the on-mirror reflection position $M^{(4)}$, the angle of incidence of the light beam that arrives at the on-mirror reflection position $M^{(4)}$ along the $X^{(4)}$ axis from the origin is shown as the angle a. As will be described hereinafter, the angle a can be calculated on the basis of the emission azimuth angle $\alpha_i$ and the emission depression angle $\beta_j$ of the emitted light beam that has arrived at the on-mirror reflection position $M^{(4)}$, and the values $C^{(1)}$ of the coordinates of the center of curvature (or the values $C^{(4)}$ of the coordinates of the center of curvature).

As can be understood by reference to FIG. 7, the values of the coordinates of the on-mirror reflection position $M^{(4)}$ in the coordinate system $L^{(4)}$ are $(r_1, 0, 0)$. Moreover, the values of the coordinates $(X^{(4)}{}_c, Y^{(4)}{}_c, Z^{(4)}{}_c)$ of the center of curvature $C^{(4)}$ in the coordinate system $L^{(4)}$ are as given by the following Equations (12) through (14):

$$X^{(4)}{}_c = r_1 + \rho \cdot \cos(a) \qquad (12)$$

$$Y^{(4)}{}_c = \rho \cdot \sin(a) \qquad (13)$$

$$Z^{(4)}{}_c = 0 \qquad (14)$$

Furthermore, the on-object reflection position $T^{(4)}$ $(X^{(4)}{}_T, Y^{(4)}{}_T, Z^{(4)}{}_T)$ in the coordinate system $L^{(4)}$ is given by the following Equations (15) through (17):

$$X^{(4)}{}_T = r_1 + (r - r_1) \cdot \cos(\pi - 2a) \qquad (15)$$

$$Y^{(4)}{}_T = -(r - r_1) \cdot \sin(\pi - 2a) \qquad (16)$$

$$Z^{(4)}{}_T = 0 \qquad (17)$$

Figure 8:
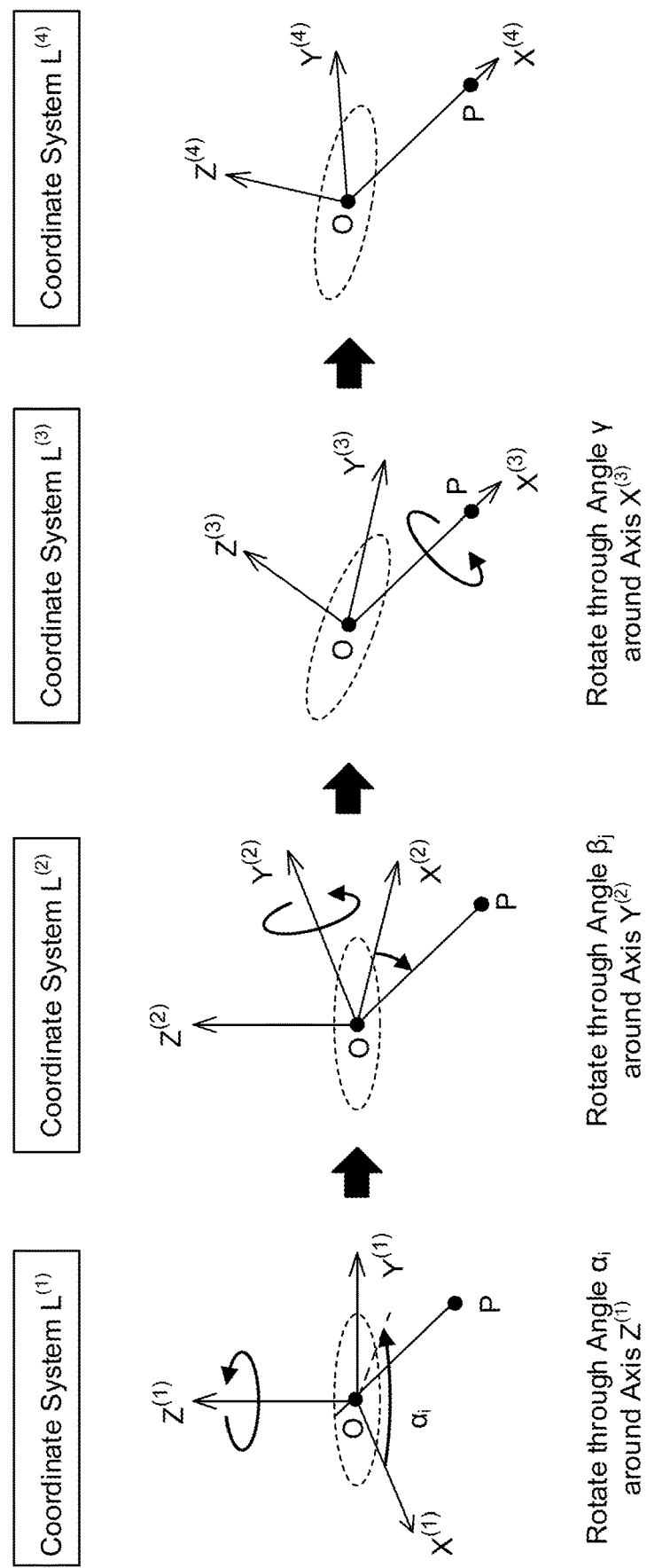
FIG. 8 is a figure for explanation of coordinate conversion from the laser radar coordinate system $L^{(1)}$ through to a coordinate system $L^{(4)}$.
Figure 9:
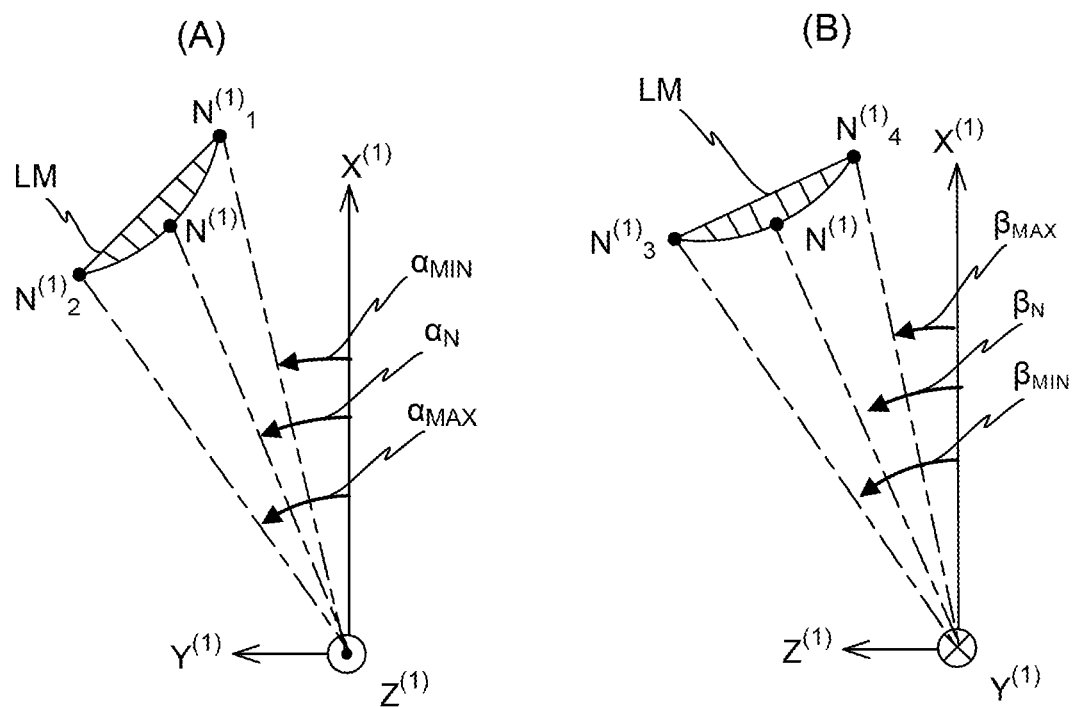
FIG. 9 is a figure for explanation of emitted beams that arrive at the traffic mirror.

As shown in FIG. 8, conversion from the coordinate system $L^{(1)}$ to the coordinate system $L^{(4)}$ can be implemented by performing, in order, conversion from the coordinate system $L^{(1)}$ $(X^{(1)}, Y^{(1)}, Z^{(1)})$ to the coordinate system $L^{(2)}$ $(X^{(2)}, Y^{(2)}, Z^{(2)})$, conversion from the coordinate system $L^{(2)}$ $(X^{(2)}, Y^{(2)}, Z^{(2)})$ to the coordinate system $L^{(3)}$ $(X^{(3)}, Y^{(3)}, Z^{(3)})$, and conversion from the coordinate system $L^{(3)}$ $(X^{(3)}, Y^{(3)}, Z^{(3)})$ to the coordinate system $L^{(4)}$ $(X^{(4)}, Y^{(4)}, Z^{(4)})$.

Here, the conversion from the coordinate system $L^{(1)}$ to the coordinate system $L^{(2)}$ is a rotation conversion consisting of rotation around the $Z^{(1)}$ axis as a central rotation axis through just the emission azimuth angle $\alpha_i$. Moreover, the conversion from the coordinate system $L^{(2)}$ to the coordinate system $L^{(3)}$ is a rotation conversion consisting of rotation around the $Y^{(2)}$ axis as a central rotation axis through just the emission depression angle $\beta_j$.

Furthermore, the conversion from the coordinate system $L^{(3)}$ to the coordinate system $L^{(4)}$ is a rotation conversion consisting of rotation through just an angle $\gamma$ around the $X^{(3)}$ axis as the central rotation axis. Here, as will be described hereinafter, the angle $\gamma$ can be calculated on the basis of the emission azimuth angle $\alpha_i$ and the emission depression angle $\beta_j$ of the emitted beam that has arrived at the on-mirror reflection position M, and the values $C^{(1)}$ of the coordinates of the center of curvature (or the values $C^{(4)}$ of the coordinates of the center of curvature).

Due to this, the conversion from the coordinate system $L^{(4)}$ $(X^{(4)}, Y^{(4)}, Z^{(4)})$ to the coordinate system $L^{(1)}$ $(X^{(1)}, Y^{(1)}, Z^{(1)})$ can be performed by using the following Equation (18):

Equation (1)

$$\begin{bmatrix} X^{(1)} \\ Y^{(1)} \\ Z^{(1)} \end{bmatrix} = \begin{bmatrix} \cos\alpha_i & -\sin\alpha_i & 0 \\ \sin\alpha_i & \cos\alpha_i & 0 \\ 0 & 0 & 1 \end{bmatrix} \cdot \begin{bmatrix} \cos\beta_j & 0 & \sin\beta_j \\ 0 & 1 & 0 \\ -\sin\beta_j & 0 & \cos\beta_j \end{bmatrix} \cdot \begin{bmatrix} 1 & 0 & 0 \\ 0 & \cos\gamma & -\sin\gamma \\ 0 & \sin\gamma & \cos\gamma \end{bmatrix} \cdot \begin{bmatrix} X^{(4)} \\ Y^{(4)} \\ Z^{(4)} \end{bmatrix} \qquad (18)$$

When, in the Equation (18), the values of the coordinates $(X^{(1)}, Y^{(1)}, Z^{(1)})$ are taken as being the center of curvature $C^{(1)}$ $(X^{(1)}{}_c, Y^{(1)}{}_c, Z^{(1)}{}_c)$ in the above described coordinate system $L^{(1)}$, and the values of the coordinates $(X^{(4)}, Y^{(4)}, Z^{(4)})$ are taken as being the center of curvature $C^{(4)}$ $(X^{(4)}{}_c, Y^{(4)}{}_c, Z^{(4)}{}_c)$ in the above described coordinate system $L^{(4)}$, three equations are obtained having the distance $r_1$, the angle a, and the angle $\gamma$ as their three unknowns. By solving these three equations that have been obtained in this manner as simultaneous equations, it is possible to obtain the distance $r_1$, the angle a, and the angle $\gamma$ by using the traffic mirror information that can be registered in advance, the distance r that can be measured, and the emission azimuth angle $\alpha_i$ and the emission depression angle $\beta_j$.

By using the distance $r_1$, the angle a, and the angle $\gamma$ that have been obtained in this manner, and by taking the values of the coordinates $(X^{(4)}, Y^{(4)}, Z^{(4)})$ in Equation (18) as being the values of the coordinates $(X^{(4)}{}_T, Y^{(4)}{}_T, Z^{(4)}{}_T)$ of the on-object reflection position $T^{(4)}$ in the coordinate system $L^{(4)}$ described above, it is possible to calculate the on-object reflection position $T^{(1)}$ $(X^{(1)}{}_T, Y^{(1)}{}_T, Z^{(1)}{}_T)$ in the coordinate system $L^{(1)}$ described above by using the traffic mirror information that can be registered in advance, the distance r that can be measured by the laser radar, and the emission azimuth angle $\alpha_i$ and the emission depression angle $\beta_j$ of the emitted beam. Here, it is possible to simplify the calculation of the on-object reflection position $T^{(1)}$ $(X^{(1)}{}_T, Y^{(1)}{}_T, Z^{(1)}{}_T)$ if the values $C^{(1)}$ of the coordinates of the center of curvature (or the values $C^{(4)}$ of the coordinates of the center of curvature) are calculated at the intermediate stage.

Note that the on-object reflection position $T^{(1)}$ ($X^{(1)}_T$, $Y^{(1)}_T$, $Z^{(1)}_T$) in the coordinate system $L^{(1)}$ relating to an emitted beam that is not reflected by the traffic mirror LM may be calculated by using the following Equations (19) through (21):

$$X^{(1)}_T = r \cdot \cos \alpha_i \cdot \cos \beta_j \quad (19)$$

$$Y^{(1)}_T = r \cdot \sin \alpha_i \cdot \cos \beta_j \quad (20)$$

$$Z^{(1)}_T = -r \cdot \sin \beta_j \quad (21)$$

(6) Distinguishing the Emitted Beam Reflected by the Traffic Mirror LM

In order to calculate the on-object reflection position $T^{(1)}$ ($X^{(1)}_T$, $Y^{(1)}_T$, $Z^{(1)}_T$) in an appropriate manner, it is necessary to decide whether the on-object reflection position $T^{(1)}$ ($X^{(1)}_T$, $Y^{(1)}_T$, $Z^{(1)}_T$) is to be calculated according to Equation (18) above, or the on-object reflection position $T^{(1)}$ ($X^{(1)}_T$, $Y^{(1)}_T$, $Z^{(1)}_T$) is to be calculated according to Equations (19) through (21) above. Due to this, it is necessary to determine whether or not the emitted beam that is being emitted from the laser radar 910 in the direction of emission ($\alpha_i$, $\beta_j$) is being reflected by the traffic mirror LM.

Note that the position $N^{(1)}_1$ shown in FIG. 9(A) is the rightmost position $N^{(1)}_1$ when the traffic mirror LM is viewed from the laser radar 910. And the position $N^{(1)}_1$ ($X^{(1)}_{N1}$, $Y^{(1)}_{N1}$, $Z^{(1)}_{N1}$) in the coordinate system $L^{(1)}$ can be calculated by using the center position $N^{(1)}$ ($X^{(1)}_N$, $Y^{(1)}_N$, $Z^{(1)}_N$), the mirror diameter D, and the azimuth angle of installation $\psi^{(1)}$, according to the following Equations (22) through (24):

$$X^{(1)}_{N1} = X^{(1)}_N - (D/2) \cdot \sin \psi^{(1)} \quad (22)$$

$$Y^{(1)}_{N1} = Y^{(1)}_N + (D/2) \cdot \cos \psi^{(1)} \quad (23)$$

$$Z^{(1)}_{N1} = Z^{(1)}_N \quad (24)$$

Furthermore, the position $N^{(1)}_2$ shown in FIG. 9(A) is the leftmost position $N^{(1)}_2$ when the traffic mirror LM is viewed from the laser radar 910. And the position $N^{(1)}_2$ ($X^{(1)}_{N2}$, $Y^{(1)}_{N2}$, $Z^{(1)}_{N2}$) in the coordinate system $L^{(1)}$ can be calculated by using the center position $N^{(1)}$ ($X^{(1)}_N$, $Y^{(1)}_N$, $Z^{(1)}_N$), the mirror diameter D, and the azimuth angle of installation $\psi^{(1)}$, according to the following Equations (25) through (27):

$$X^{(1)}_{N2} = X^{(1)}_N + (D/2) \cdot \sin \psi^{(1)} \quad (25)$$

$$Y^{(1)}_{N2} = Y^{(1)}_N - (D/2) \cdot \cos \psi^{(1)} \quad (26)$$

$$Z^{(1)}_{N2} = Z^{(1)}_N \quad (27)$$

Yet further, the position $N^{(1)}_3$ shown in FIG. 9(B) is the uppermost position when the traffic mirror LM is viewed from the laser radar 910. And the position $N^{(1)}_3$ ($X^{(1)}_{N3}$, $Y^{(1)}_{N3}$, $Z^{(1)}_{N3}$) in the coordinate system $L^{(1)}$ can be calculated by using the center position $N^{(1)}$ ($X^{(1)}_N$, $Y^{(1)}_N$, $Z^{(1)}_N$), the mirror diameter D, and the depression angle of installation $\theta^{(1)}$, according to the following Equations (28) through (30):

$$X^{(1)}_{N3} = X^{(1)}_N - (D/2) \cdot \sin \theta^{(1)} \quad (28)$$

$$Y^{(1)}_{N3} = Y^{(1)}_N \quad (29)$$

$$Z^{(1)}_{N3} = Z^{(1)}_N + (D/2) \cdot \cos \theta^{(1)} \quad (30)$$

Even further, the position $N^{(1)}_4$ shown in FIG. 9(B) is the lowermost position when the traffic mirror LM is viewed from the laser radar 910. And the position $N^{(1)}_4$ ($X^{(1)}_{N4}$, $Y^{(1)}_{N4}$, $Z^{(1)}_{N4}$) in the coordinate system $L^{(1)}$ can be calculated by using the center position $N^{(1)}$ ($X^{(1)}_N$, $Y^{(1)}_N$, $Z^{(1)}_N$), the mirror diameter D, and the depression angle of installation $\theta^{(1)}$, according to the following Equations (31) through (33):

$$X^{(1)}_{N4} = X^{(1)}_N + (D/2) \cdot \sin \theta^{(1)} \quad (31)$$

$$Y^{(1)}_{N4} = Y^{(1)}_N \quad (32)$$

$$Z^{(1)}_{N4} = Z^{(1)}_N - (D/2) \cdot \cos \theta^{(1)} \quad (33)$$

During the determination as to whether or not the emitted beam described above is reflected by the traffic mirror LM, first, the maximum reflection azimuth angle $\alpha_{MAX}$, the center reflection azimuth angle $\alpha_N$, and the minimum reflection azimuth angle $\alpha_{MIN}$ shown in FIG. 9(A) are calculated, and moreover the maximum reflection depression angle $\beta_{MAX}$, the center reflection depression angle $\beta_N$, and the minimum reflection depression angle $\beta_{MIN}$ shown in FIG. 9(B) are calculated. Note that, in the actual situation, since the distance between the laser radar 910 and the traffic mirror LM is much longer than the radius of curvature $\rho$ of the traffic mirror LM, accordingly the following Equations (34) and (35) are valid:

$$\alpha_N \approx (\alpha_{MAX} + \alpha_{MIN})/2 \quad (34)$$

$$\beta_N \approx (\beta_{MAX} + \beta_{MIN})/2 \quad (35)$$

Now, the minimum reflection azimuth angle $\alpha_{MIN}$, the center reflection azimuth angle $\alpha_N$, and the maximum reflection azimuth angle $\alpha_{MAX}$ may be calculated by using the following Equations (36) through (38), on the basis of the position $N^{(1)}_1$ ($X^{(1)}_{N1}$, $Y^{(1)}_{N1}$, $Z^{(1)}_{N1}$), the center position $N^{(1)}$ ($X^{(1)}_N$, $Y^{(1)}_N$, $Z^{(1)}_N$), and the position $N^{(1)}_2$ ($X^{(1)}_{N2}$, $Y^{(1)}_{N2}$, $Z^{(1)}_{N2}$) in the coordinate system $L^{(1)}$ described above:

$$\alpha_{MIN} = \tan^{-1}[(Y^{(1)}_N - (D/2) \cdot \cos \psi^{(1)})/(X^{(1)}_N + (D/2) \cdot \sin \psi^{(1)})] \quad (36)$$

$$\alpha_N = \tan^{-1}[Y^{(1)}_N / X^{(1)}_N] \quad (37)$$

$$\alpha_{MAX} = \tan^{-1}[(Y^{(1)}_N + (D/2) \cdot \cos \psi^{(1)})/(X^{(1)}_N - (D/2) \cdot \sin \psi^{(1)})] \quad (38)$$

Further, the minimum reflection depression angle $\beta_{MIN}$, the center reflection depression angle $\beta_N$, and the maximum reflection depression angle $\beta_{MAX}$ may be calculated by using the following Equations (39) through (41), on the basis of the position $N^{(1)}_3$ ($X^{(1)}_{N3}$, $Y^{(1)}_{N3}$, $Z^{(1)}_{N3}$), the center position $N^{(1)}$ ($X^{(1)}_N$, $Y^{(1)}_N$, $Z^{(1)}_N$), and the position $N^{(1)}_4$ ($X^{(1)}_{N4}$, $Y^{(1)}_{N4}$, $Z^{(1)}_{N4}$) in the coordinate system $L^{(1)}$ described above:

$$\beta_{MIN} = \tan^{-1}[(Z^{(1)}_N + (D/2) \cdot \cos \theta^{(1)})/(X^{(1)}_N - (D/2) \cdot \sin \theta^{(1)})] \quad (39)$$

$$\beta_N = \tan^{-1}[(Z^{(1)}_N / X^{(1)}_N)] \quad (40)$$

$$\beta_{MAX} = \tan^{-1}[(Z^{(1)}_N - (D/2) \cdot \cos \theta^{(1)})/(Z^{(1)}_N + (D/2) \cdot \sin \theta^{(1)})] \quad (41)$$

Figure 10:
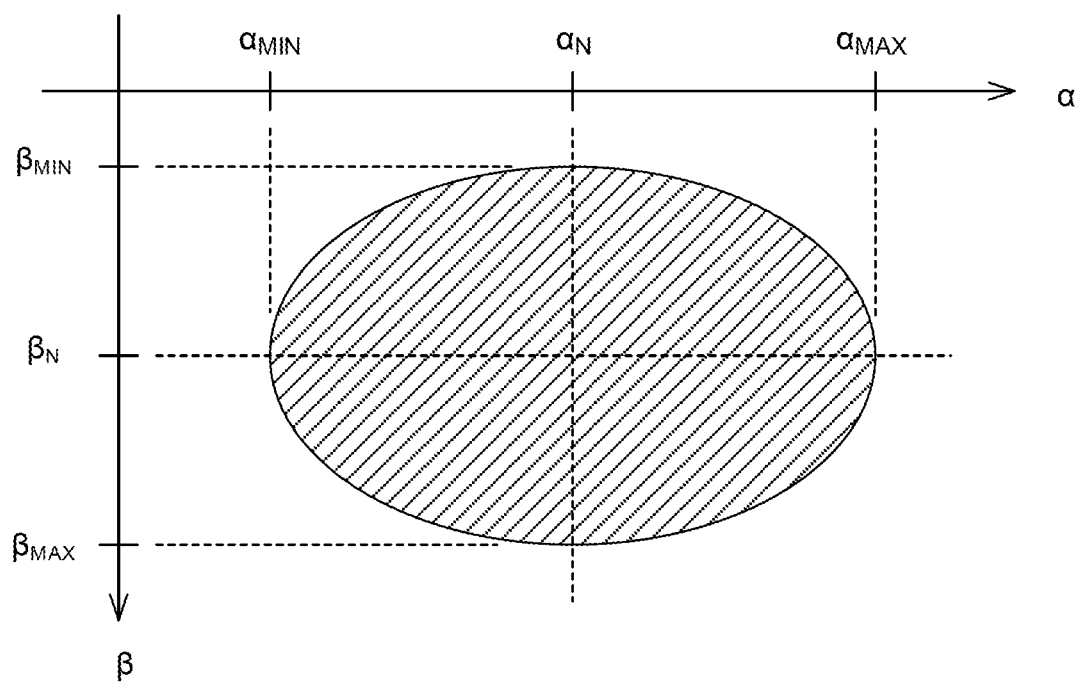
FIG. 10 is a figure for explanation of the direction of emission of light that arrives at the traffic mirror.

And, in order for the emitted beam that has been emitted from the laser radar 910 in the direction of emission ($\alpha_i$, $\beta_j$) to be reflected by the traffic mirror LM, the condition must hold that its direction of emission ($\alpha_i$, $\beta_j$) is within the elliptical region shown in FIG. 10. Whether or not the direction of emission ($\alpha_i$, $\beta_j$) satisfies the condition can be determined by making a decision as to whether or not the following Equation (42) is satisfied:

Equation (2)

$$\frac{(\alpha_i - \alpha_N)^2}{\left(\frac{\alpha_{MAX} - \alpha_{MIN}}{2}\right)^2} + \frac{(\beta_j - \beta_N)^2}{\left(\frac{\beta_{MAX} - \beta_{MIN}}{2}\right)^2} < 1 \qquad (42)$$

(7) Determining Whether or not the On-Object Reflection Position T is Located Upon the Road Surface As described above, it is arranged for the laser radar 910 to be mounted at a position that is at a height "H" from the road surface. Due to this, if the value $Z^{(1)}{}_T$ of the $Z^{(1)}$ coordinate in the calculated on-object reflection position $T^{(1)}$ ($X^{(1)}{}_T$, $Y^{(1)}{}_T$, $Z^{(1)}{}_T$) is almost "−H", then it can be determined that this on-object reflection position is positioned upon the road surface. In other words, if Equation (43) below is satisfied, then it can be determined that the on-object reflection position T is located at a position upon the road surface:

$$|Z^{(1)}{}_T + H| < \delta \qquad (43)$$

(8) Detection of Obstacles

The center positions of obstacles can be detected by performing clustering processing or the like on the basis of the spatial distribution of the points of on-object reflection positions (herein also sometimes referred to as the "on-object reflection positions) $T^{(0)}{}_{ij}$) in the map coordinate system $L^{(0)}$ for each of the directions of emission $(\alpha_i, \beta_j)$ that have been calculated as described above, while excluding on-object reflection positions upon the road surface. Obstacles that have been detected are identified, and are classified into static obstacles and moving obstacles, according as to whether or not there is any change over time of their central positions in the map coordinate system $L^{(0)}$. Here, in the case of a moving obstacle, it is possible to detect its speed of moving and its direction of moving on the basis of the change over time of its center position in the map coordinate system $L^{(0)}$.

[Configuration of the Driving Assistance Device 700]

Next, the configuration of the driving assistance device 700 according to the embodiment will be explained.

Figure 11:
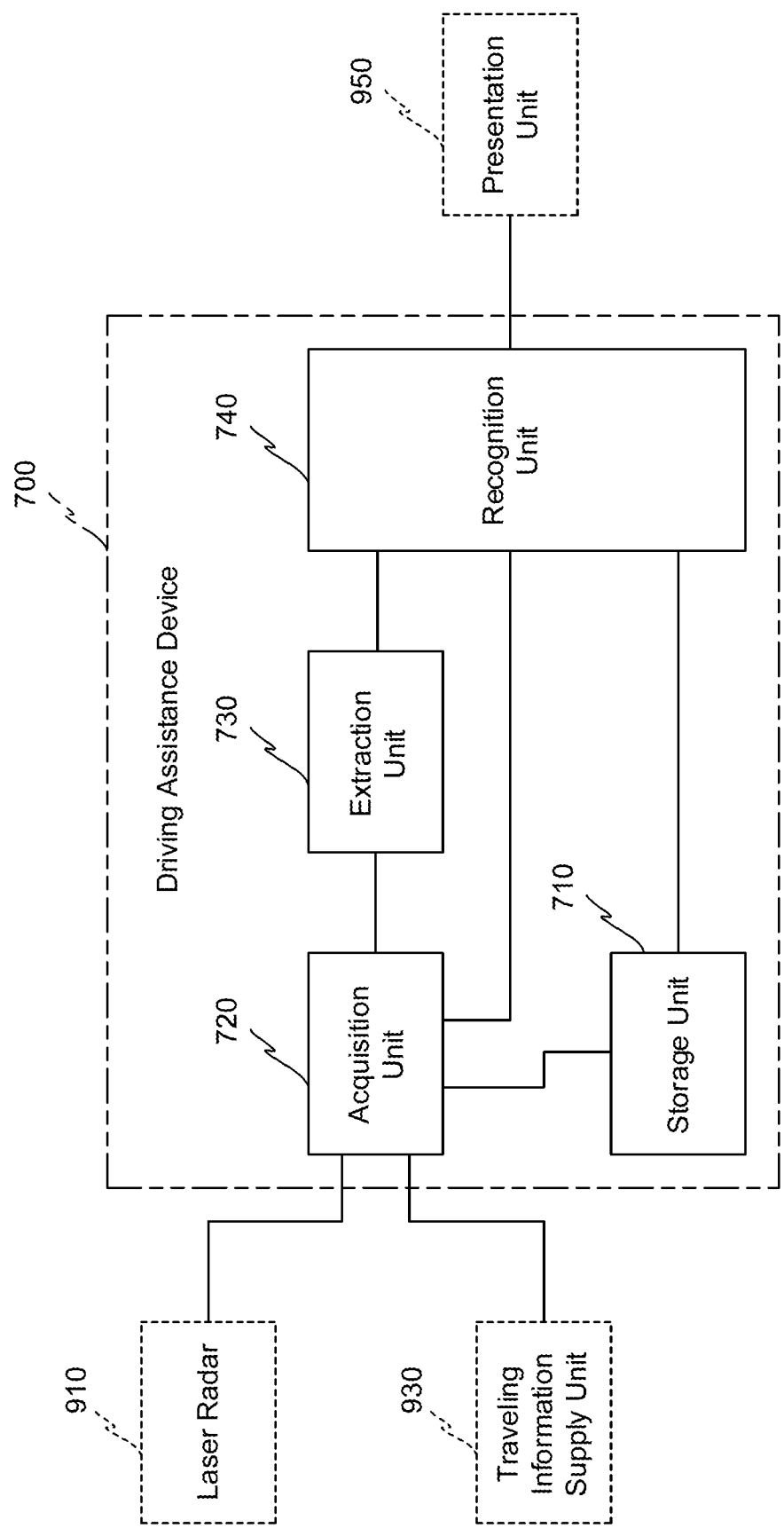
FIG. 11 is a block diagram for explanation of the configuration of a driving assistance device according to an embodiment.

The configuration of the driving assistance device 700 is shown in FIG. 11 as a block diagram. As shown in FIG. 11, a traveling information supply unit 930 and a presentation unit 950 are connected to the driving assistance device 700, in addition to the laser radar 910 described above.

For each direction of emission $(\alpha_i, \beta_j)$, the laser radar 910 sequentially measures the optical path length $r_{ij}$ from the laser radar 910 to the corresponding on-object reflection position (hereinafter this is also sometimes termed the "optical path length $r_{ij}$"; the optical path length $r_{ij}$ has the same value in every coordinate system). The optical path lengths $r_{ij}$ that are measured in this manner are repeatedly sent in sequence to the driving assistance device 700.

The traveling information supply unit 930 described above detects the current position, the direction of traveling, and the traveling speed of the moving body MV in the map coordinate system $L^{(0)}$. And the results of the detection by the traveling information supply unit 930 are sequentially sent to the driving assistance device 700.

Furthermore, the traveling information supply unit 930 keeps the planned travel path of the moving body MV. And, each time the planned travel path of the moving body MV is updated, the traveling information supply unit 930 sends the new planned travel path to the driving assistance device 700.

The presentation unit 950 comprises a display unit, a sound output unit, and so on. And, according to presentation information sent from the driving assistance device 700, the presentation unit 950 performs image displaying, audio outputting, and so on.

As shown in FIG. 11, the driving assistance device 700 comprises a storage unit 710 and an acquisition unit 720. Moreover, the driving assistance device 700 comprises an extraction unit 730 and a recognition unit 740.

Information of various kinds is recorded in the storage unit 710 described above. Map information, traffic mirror information, information about the position at which the laser radar 910 is mounted to the moving body MV including the height H of the laser radar 910 from the road surface (hereinafter sometimes this will simply be referred to as the "mounting position information"), and so on are included in these various kinds of information. The acquisition unit 720 and the recognition unit 740 are adapted to be capable of accessing the storage unit 710.

Road shape data that specifies the shapes of roads by links and nodes (intersections and so on) and road neighborhood data that specifies the shapes of buildings in the vicinity of the roads and so on are included in the map information. Moreover, road gradients, road widths, whether or not traffic signals are present, and so on are also included in the map information.

As described above, the center position $N^{(0)}$ of the traffic mirror LM in the map coordinate system $L^{(0)}$ is included in the traffic mirror information. Moreover, the radius of curvature $\rho$ and the diameter D of the traffic mirror LM, and its azimuth angle of installation $\psi^{(0)}$ and its depression angle of installation $\theta^{(0)}$ in the map coordinate system $L^{(0)}$ are all included in the traffic mirror information.

The acquisition unit 720 acquires the optical path lengths $r_{ij}$ sent from the laser radar 910. And the optical path lengths $r_{ij}$ acquired in this manner are sent to the extraction unit 730.

Furthermore, the acquisition unit 720 acquires the current position of the moving body MV, its direction of traveling, and its traveling speed sent from the traveling information supply unit 930, and also acquires the planned travel path of the moving body MV. The current position and the direction of traveling of the moving body MV that have been acquired in this manner are sent to the extraction unit 730 and to the recognition unit 740. Moreover, the traveling speed and the planned travel path of the moving body MV that have been acquired are sent to the recognition unit 740.

Yet further, the acquisition unit 720 acquires the mounting position information, information about the surroundings of the current position of the moving body MV, and traffic mirror information from the storage unit 710. The mounting position information, the gradient of the road upon which the moving body is traveling in the map information (hereinafter termed the "road gradient information"), and the traffic mirror information that have been acquired in this manner are sent to the extraction unit 730. Moreover, the map information that has been acquired is sent to the recognition unit 740.

The extraction unit 730 receives the current position of the moving body MV, its direction of traveling, the road gradient information, the traffic mirror information, and mounting position information, and the optical path lengths $r_{ij}$ sent from the acquisition unit 720. Then, on the basis of the information sent from the acquisition unit 720, each time a new optical path length $r_{ij}$ is received, and after having calculated the on-object reflection position $T^{(1)}{}_{ij}$, the extraction unit 730 calculates the on-object reflection position $T^{(0)}{}_{ij}$. The on-object reflection position $T^{(0)}{}_{ij}$ and the on-object reflection position $T^{(1)}{}_{ij}$ that have been calculated in this manner are sent to the recognition unit 740.

Note that the details of the extraction processing performed by the extraction unit 730 will be described hereinafter.

The recognition unit 740 receives the current position of the moving body MV, its direction of traveling, its traveling speed and its planned travel path, and the map information sent from the acquisition unit 720, and receives the on-object reflection positions) $T^{(0)}{}_{ij}$ and the on-object reflection positions $T^{(1)}{}_{ij}$ sent from the extraction unit 730. Subsequently, the recognition unit 740 detects the positions of obstacles and their speeds of movement on the basis of the on-object reflection positions $T^{(0)}{}_{ij}$ and the on-object reflection positions $T^{(1)}{}_{ij}$.

Next, the recognition unit 740 identifies the detected obstacle(s) and classifies the detected obstacle(s) into either static obstacle(s) or moving obstacle(s). And, if an obstacle that is classified as a static obstacle is not registered in the map information, then that obstacle is added to the map information. Subsequently, the recognition unit 740 generates presentation information relating to the obstacle(s) that have thus been identified, and sends the generated presentation information to the presentation unit 950. As a result, information related to the obstacle(s) is presented to the user.

Furthermore, the recognition unit 740 evaluates the level of danger of a collision between an obstacle that has been classified as a moving obstacle and the moving body MV. And, if the level of danger is high, then the recognition unit 740 generates presentation information for presentation of that fact, and sends the presentation information to the presentation unit 950. As a result, the fact that the level of danger of collision is high is presented to the user.

Note that the details of the detection processing performed by the recognition unit 740 will be described hereinafter.

[Operation of the Driving Assistance Device 700]

Next, the operation of the driving assistance device 700 having a configuration as described above will be explained, with attention being principally directed to the extraction processing performed by the extraction unit 730 and to the detection processing performed by the recognition unit 740.

As a precondition, it will be supposed that the laser radar 910 starts its operation, and that the measured optical path lengths $r_{ij}$ are sequentially and repeatedly sent from the laser radar 910 to the acquisition unit 720 of the driving assistance device 700.

Moreover it will be supposed that the traveling information supply unit 930 starts its operation, and that, along with repeatedly transmitting the current position of the moving body MV in the coordinate system $L^{(0)}$, its direction of traveling, and its traveling speed that have been detected to the acquisition unit 720, also the traveling information supply unit 930 sends the most recently planned travel path of the moving body MV to the acquisition unit 720.

The acquisition unit 720 receives the optical path lengths $r_{ij}$, the current position and the direction of traveling of the moving body MV in the coordinate system $L^{(0)}$, and the traveling speed, and the planned travel path of the moving body MV. Subsequently, the acquisition unit 720 acquires the mounting position information, the map information for the surroundings of the current position of the moving body MV, and the traffic mirror information from the storage unit 710.

And then the acquisition unit 720 sends the mounting position information, the current position and the direction of traveling of the moving body MV in the coordinate system $L^{(0)}$, and the road gradient information, and the traffic mirror information and the optical path lengths $r_{ij}$ to the extraction unit 730. Moreover, the acquisition unit 720 sends the current position and the direction of traveling of the moving body MV in the coordinate system $L^{(0)}$, and the traveling speed the planned travel path, and the map information to the recognition unit 740.

On the basis of the information sent from the acquisition unit 720 to the extraction unit 730 in this manner, the extraction unit 730 performs extraction processing and calculates the on-object reflection positions $T^{(0)}{}_{ij}$ and the on-object reflection positions $T^{(1)}{}_{ij}$, and sends the results of the calculation to the recognition unit 740. Furthermore, the recognition unit 740 performs recognition processing on the basis of the information sent to the recognition unit 740 from the acquisition unit 720, and the on-object reflection positions $T^{(0)}{}_{ij}$ and the on-object reflection positions $T^{(1)}{}_{ij}$ sent from the extraction unit 730.

<The Extraction Processing Performed by the Extraction Unit 730>

Next, the extraction processing performed by the extraction unit 730 will be explained.

During the extraction processing, the extraction unit 730 establishes the coordinate system $L^{(1)}$ described above on the basis of the mounting position information, the current position and the direction of traveling of the moving body MV, and the road gradient information. Subsequently, the extraction unit 730 refers to the traffic mirror information, and makes a decision as to whether or not any traffic mirror is present in the surroundings of the moving body MV.

If no traffic mirror is present in the vicinity, then the extraction unit 730 calculates the on-object reflection positions $T^{(1)}{}_{ij}$ for all of the optical path lengths $r_{ij}$ according to Equations (19) through (21). Subsequently, the extraction unit 730 converts the on-object reflection positions $T^{(1)}{}_{ij}$ to on-object reflection positions $T^{(0)}{}_{ij}$. Then the extraction unit 730 sends the on-object reflection positions $T^{(1)}{}_{ij}$ and the on-object reflection positions $T^{(0)}{}_{ij}$ to the recognition unit 740.

If a traffic mirror is present in the vicinity, then the extraction unit 730 firstly converts the center position $N^{(0)}$, the reflection azimuth angle $\psi^{(0)}$, and the reflection depression angle $\theta^{(0)}$ for the traffic mirror information into the center position $N^{(1)}$, the reflection azimuth angle $\psi^{(1)}$, and the reflection depression angle $\theta^{(1)}$. Subsequently, for each of the emitted beams in each of the directions of emission $(\alpha_i, \beta_j)$, the extraction unit 730 decides whether that beam is reflected by the traffic mirror or not, according to whether the condition in Equation (42) is satisfied or not.

Next, for the optical path lengths $r_{ij}$ corresponding to those ones of the emitted beams that are reflected by the traffic mirror, the on-object reflection positions $T^{(1)}{}_{ij}$ is calculated according to Equation (18) described above. On the other hand, for the optical path lengths $r_{ij}$ corresponding to those ones of the emitted beams that are not reflected by the traffic mirror, the on-object reflection positions $T^{(1)}{}_{ij}$ are calculated according to Equations (19) through (21).

And next, the extraction unit 730 converts the on-object reflection positions $T^{(1)}{}_{ij}$ to an on-object reflection positions $T^{(0)}{}_{ij}$. The extraction unit 730 then sends the on-object reflection positions) $T^{(0)}{}_{ij}$ and the on-object reflection positions $T^{(1)}{}_{ij}$ to the recognition unit 740.

<The Detection Processing by the Recognition Unit 740>

Next, the detection processing performed by the recognition unit 740 will be explained.

During the detection processing, first, from among the on-object reflection positions $T^{(0)}{}_{ij}$, the recognition unit 740 eliminates those positions in the coordinate system $L^{(O)}$ corresponding to on-object reflection positions in the on-object reflection positions $T^{(1)}_{ij}$ that satisfy the condition of Equation (43). Subsequently, the recognition unit 740 eliminates points upon the outer surfaces of the shapes of buildings or the like that are registered in the map information from among the on-object reflection positions $T^{(O)}_{ij}$, and thereby extracts new obstacle positions.

Then, the recognition unit 740 performs clustering processing upon the groups of points that have been extracted in the obstacle positions, and, along with performing detection of obstacles, also detects the position of their centers. Subsequently, the recognition unit 740 refers to the result of the most recent clustering processing, and detects the speeds of movement of the obstacles and their directions of moving.

Next, the recognition unit 740 identifies the detected obstacle(s) and classifies the obstacles that have thus been detected as being static obstacles or moving obstacles, on the basis of their detected speeds of movement. Subsequently, the recognition unit 740 adds information for obstacles that have been classified as being static obstacles to the map information in the storage unit 710. And, on the basis of the obstacle information that has been detected and the map information, the recognition unit 740 generates normal presentation information for presenting information relating to the obstacles, and sends the normal presentation information that has thus been generated to the presentation unit. As a result, information generally related to the obstacles is presented to the user.

Next, on the basis of the speed of movement and the direction of moving of the moving obstacle(s), and the current position and traveling speed of the moving body MV and its planned travel path, the recognition unit 740 evaluates the level of danger of a collision between the moving body MV and the moving obstacle(s). If, as the result of the evaluation, it is found that some moving obstacle is present for which it cannot be said that the collision danger level is low, then warning presentation information that specifies the moving obstacle is generated, and the generated warning presentation information is sent to the presentation unit 950. As a result, information for providing a warning related to collision is presented to the user.

As described above, in the embodiment, the acquisition unit 720 acquires the optical path lengths $r_{ij}$, which are information about the surroundings of the moving body MV that has been acquired by utilizing the laser radar 910 that is mounted upon the moving body MV, the traffic mirror information which includes the center position $N^{(O)}$ of the traffic mirror LM on the map, and the position information for the moving body MV on the map. Then, on the basis of the traffic mirror information and the position information for the moving body MV on the map that have thus been acquired, after having extracted, from among the optical path lengths $r_{ij}$ that have been acquired, those optical path lengths that were acquired via the traffic mirror LM, the extraction unit 730 then calculates the on-object reflection positions that correspond to those extracted optical path lengths.

Thus, according to the embodiment, while maintaining high robustness against surrounding environmental conditions such as variation of external illumination and so on, it is possible to obtain information relating to the surroundings in the blind spot of the driver at high accuracy, and thereby it is also possible to provide advanced driving assistance.

Yet further, in the embodiment on the basis of the results of extraction by the extraction unit 730 and the map information, the recognition unit 740 detects obstacles to the traveling of the moving body MV that are not included in the map information. Due to this, it is possible to identify obstacles that are present in the blind spot of the driver.

Even further, in the embodiment, the recognition unit 740 classifies the obstacle that has been detected and identified into either the static obstacle or the moving obstacle, and adds information for the static obstacles to the map information. By doing this, it is possible to update the map information in an appropriate manner.

Moreover, in the embodiment, the acquisition unit 720 further acquires the traveling speed and the planned travel path of the moving body MV. And the recognition unit 740 performs detection of the direction of traveling and the speed of movement of moving obstacles, and evaluates the danger level of collision between the moving body and moving obstacles on the basis of the directions of moving and the speeds of movement that have thus been detected, and on the basis of the traveling speed and the planned travel path of the moving body MV. Due to this, it is possible to provide advanced driving assistance to the user.

Modification of the Embodiment

Modifications of various types may be made to the embodiment described above.

For example, the ranges of change of the directions of emission ($\alpha_i$, $\beta_j$) of the emitted beams of the laser radar 910 and their step amounts in the embodiment described above are only cited by way of example; it would be possible to employ any desired ranges of change and step amounts for change, provided that the ranges of change and the step amounts for change of the directions of emission correspond to the regions in which it is necessary to calculate the positions of reflected objects and to the permitted accuracy by which the on-object reflection positions are to be calculated.

Furthermore, in the embodiment described above, it was arranged to evaluate the level of danger of a collision between the moving body and a moving obstacle by utilizing the directions of moving and the speeds of movement of the moving obstacle that have been detected and identified. By contrast, instead of employing the directions of moving of the moving obstacles, it would also be acceptable to arrange to evaluate the level of danger of collision between the moving body and the moving obstacles by utilizing the paths of moving of the moving obstacles, which are estimated on the basis of the directions of moving of the moving obstacles and the map information.

Yet further, in the embodiment described above, a configuration is employed in which the traveling information supply unit 930 and the presentation unit 950 are disposed exterior to the driving assistance device 700. However, by contrast, if no device is available on the exterior that is capable of being utilized as the traveling information supply unit 930 or the presentation unit 950, then it will be acceptable to arrange to provide the driving assistance device 700 with a traveling information supply unit or with a presentation unit.

Note that it would also be possible to arrange to implement the driving assistance device of the embodiment described above as a computer that serves as a calculation unit and that comprises a central processing unit (CPU) and so on, and to execute the processing by the driving assistance device described above by executing a program that is prepared in advance upon that computer. The program may be recorded upon a computer-readable recording medium such as a hard disk, a CD-ROM, a DVD, or the like, and may be loaded by the computer from the recording medium and executed. Moreover, it would be acceptable to arrange for the program to be acquired in a format of being recorded upon a transportable recording medium such as a CD-ROM, a DVD, or the like; or it would also be acceptable to arrange for it to be acquired in a format of being distributed via a network such as the internet or the like.

EXAMPLE

In the following, an example of the present invention will be explained with reference to FIGS. 12 through 19. Note that, in the following explanation and drawings, the same reference signs are appended to elements that are the same as or equivalent to ones that are included in the embodiment described above, and duplicated explanation will be omitted.

[Configuration]

Figure 12:
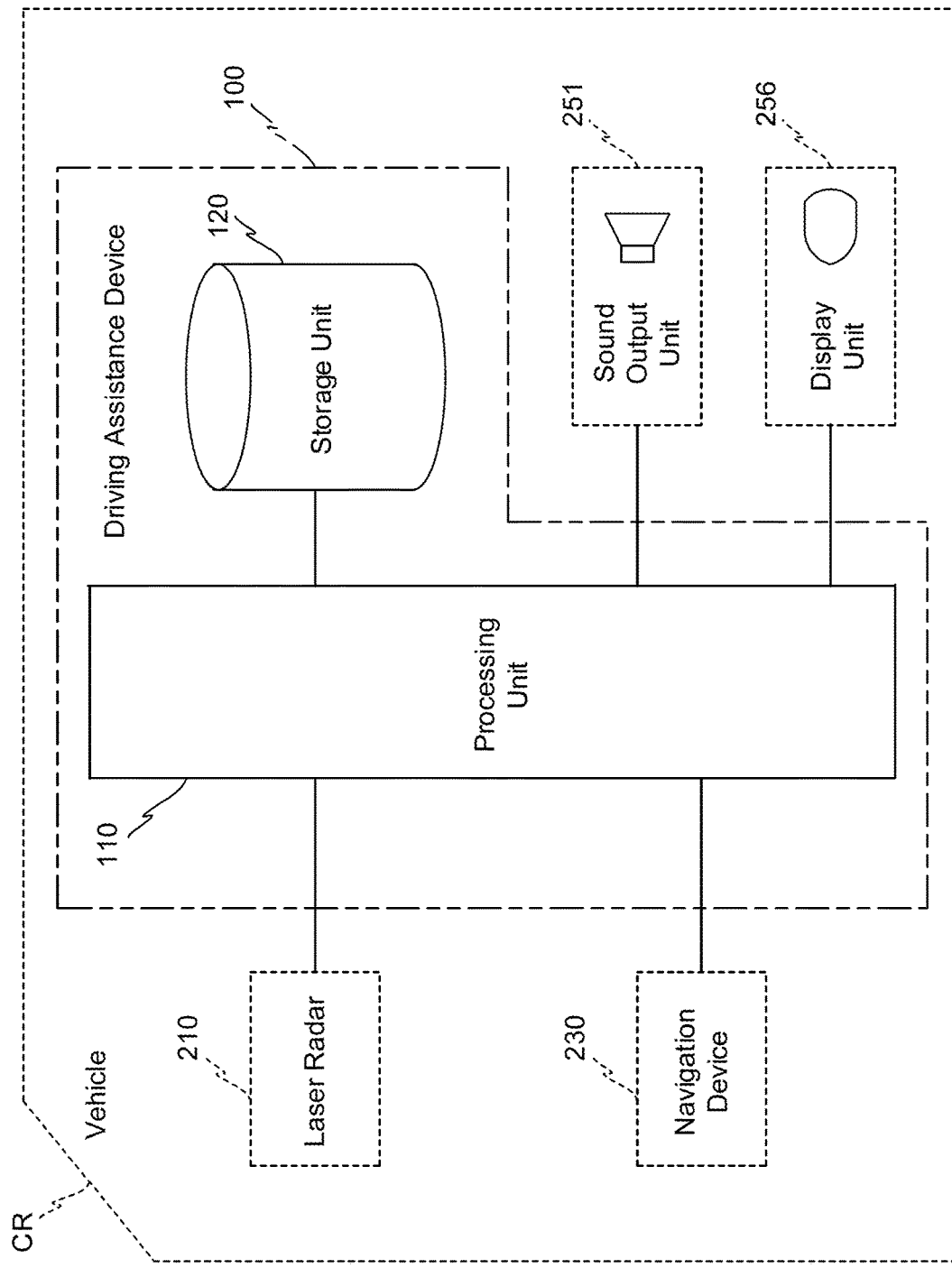
FIG. 12 is a block diagram for explanation of the configuration of a driving assistance device according to an example.

The configuration of a driving assistance device 100 according to an example of the present invention is shown in FIG. 12 as a block diagram. The driving assistance device 100 is one aspect of the driving assistance device 700 of the embodiment described above (refer to FIG. 11).

As shown in FIG. 12, the driving assistance device 100 is disposed in a vehicle CR that stands for the abovementioned moving body MV and that is travelling upon a road. And, in the example, the vehicle CR is equipped with a laser radar 210 having a configuration similar to that of the laser radar 910 described above, a navigation device 230, a sound output unit 251, and a display unit 256.

Note that, in a similar manner to the case with the laser radar 910, the laser radar 210 is mounted at a position that is at a height H from the road surface.

The navigation device 230 detects the current position of the vehicle CR and its direction of traveling in the coordinate system) $L^{(0)}$, and its traveling speed. And the navigation device 230 sequentially sends the results of detection to the driving assistance device 100, each time it detects the current position of the vehicle CR, its direction of traveling, and its traveling speed.

Furthermore, according to commands from the user, the navigation device 230 sets a planned travel path for the vehicle CR.

And, each time the planned travel path for the vehicle CR is updated, the navigation device sends the new planned travel path to the driving assistance device 100.

In other words, the navigation device fulfills the function of the traveling information supply unit 930 described above.

The sound output unit 251 comprises a speaker. The sound output unit 251 outputs audio corresponding to audio data that is sent from the driving assistance device 100.

The display unit 256 comprises a display device such as a liquid crystal panel or the like. And the display unit 256 displays images that correspond to display data sent from the driving assistance device 100.

Note that, in the example, the presentation unit 950 described above is implemented as the sound output unit 251 and the display unit 256.

[The Configuration of the Driving Assistance Device 100]

Next, the configuration of the driving assistance device 100 will be explained.

As shown in FIG. 12, the driving assistance device 100 comprises a processing unit 110. Moreover, the driving assistance device 100 comprises a storage unit 120.

The processing unit 110 is configured to comprise a central processing unit (CPU) and peripheral circuitry thereof. Functions of various types of the driving assistance device 100 are implemented by the processing unit 110 executing programs of various types. These functions also include functions of the acquisition unit 720, the extraction unit 730, and the recognition unit 740 of the embodiment described above.

Note that the program executed by the processing unit 110 may be recorded upon a computer-readable recording medium such as a hard disk, a CD-ROM, a DVD, or the like, and may be loaded by the computer from the recording medium and executed. Moreover, it would be acceptable to arrange for the program to be acquired in a format of being recorded upon a transportable recording medium such as a CD-ROM, a DVD, or the like; or it would also be acceptable to arrange for it to be acquired in a format of being distributed via a network such as the internet or the like.

The storage unit 120 includes a non-volatile storage device.

It is arranged for the processing unit 110 to be capable of accessing the storage unit 120.

Information of various kinds used by the driving assistance device 100 is stored in the storage unit 120. The information stored in the storage unit 120 includes map information, traffic mirror information similar to that in the case of the embodiment described above, and mounting position information upon the vehicle CR for the laser radar 210, including the height of the laser radar 210 from the road surface (hereinafter this is also sometimes termed "mounting position information"). Furthermore, the information stored in the storage unit 120 also includes the current position of the vehicle CR in the coordinate system $L^{(0)}$, its direction of traveling and its traveling speed, its planned travel path, and the optical path lengths $r_{ij}$ sent from the laser radar 210.

Note that, in the example, road shape data representing the shape of the road by links and nodes (intersections and so on), road neighborhood data representing the shapes of buildings beside the road and so on, and general map information including road gradients, road widths, the presence or absence of signals, and so on are included in the map information. Moreover, local point group map information (LPGM) that is employed as will be described hereinafter, in which positions upon static obstacles are expressed as points, is also included in the map information.

Furthermore, in the example, the region in which the optical path lengths $r_{ij}$ are stored has a toggle buffer structure. The size of a single buffer region in the toggle buffer structure is an appropriate size for storage of the optical path lengths $r_{ij}$ corresponding to the total number of combinations of (i,j) (hereinafter termed "pairs (i,j)") for the directions of emission ($\alpha_i$, $\beta_j$) of the emitted beams from the laser radar 210.

Note that, each time the processing unit receives an optical path length $r_{ij}$ sent from the laser radar 210, it stores that optical path length $r_{ij}$ sequentially into a single one of the buffer regions. And, when the most recent optical path length $r_{ij}$ causes that single buffer region to become filled up, then the storage of the optical path lengths $r_{ij}$ from the laser radar 210 into another buffer region is started. Here, the time interval from when the storage of optical path lengths $r_{ij}$ into a single buffer region in the toggle buffer structure starts until that single buffer becomes full is set to be a sufficiently short time interval from the standpoint of driving assistance.

Moreover, each time the processing unit 110 newly receives the current position of the vehicle CR, its direction of traveling, its traveling speed, and/or its planned travel path, it updates the current position, the direction of traveling, the traveling speed, and/or the planned travel path of the vehicle CR in the storage unit 120 to the new current position, direction of traveling, traveling speed, and/or planned travel path of the vehicle CR.

[The Operation of the Driving Assistance Device 100]

Next, the operation of the driving assistance device 100 having the configuration described above will be explained, with attention being principally focused upon the driving assistance processing performed by the processing unit 110.

As a premise, it will be supposed that the laser radar 210 has started its operation, and that the optical path lengths $r_{ij}$ that are being measured are being repeatedly and sequentially sent from the laser radar 210 to the processing unit 110 of the driving assistance device 100. Furthermore, it will be supposed that the navigation device 230 has started its operation, and that, along with the current position of the vehicle CR in the coordinate system $L^{(0)}$, its direction of traveling, and its traveling speed being detected and being repeatedly sent to the processing unit 110, also the newest planned travel path for the vehicle CR is sent to the processing unit 110.

As described above, each time an optical path length $r_{ij}$ is sent from the laser radar 210, the processing unit 110 stores that optical path length $r_{ij}$ sequentially in one of the buffer regions. And, when the most recent optical path length $r_{ij}$ causes that one of the buffer regions to become full, then the processing unit 110 starts to store the optical path lengths $r_{ij}$ sent from the laser radar 210 in another buffer region. Moreover, each time the processing unit 110 newly receives the current position of the vehicle CR in the coordinate system $L^{(0)}$, its direction of traveling, its traveling speed, and/or its planned travel path sent from the navigation device 230, it updates the current position, the direction of traveling, the traveling speed, and/or the planned travel path of the vehicle CR in the storage unit 120 to the new current position, direction of traveling, traveling speed, and/or planned travel path of the vehicle CR. And driving assistance processing is performed in parallel with the data gathering processing.

Figure 13:
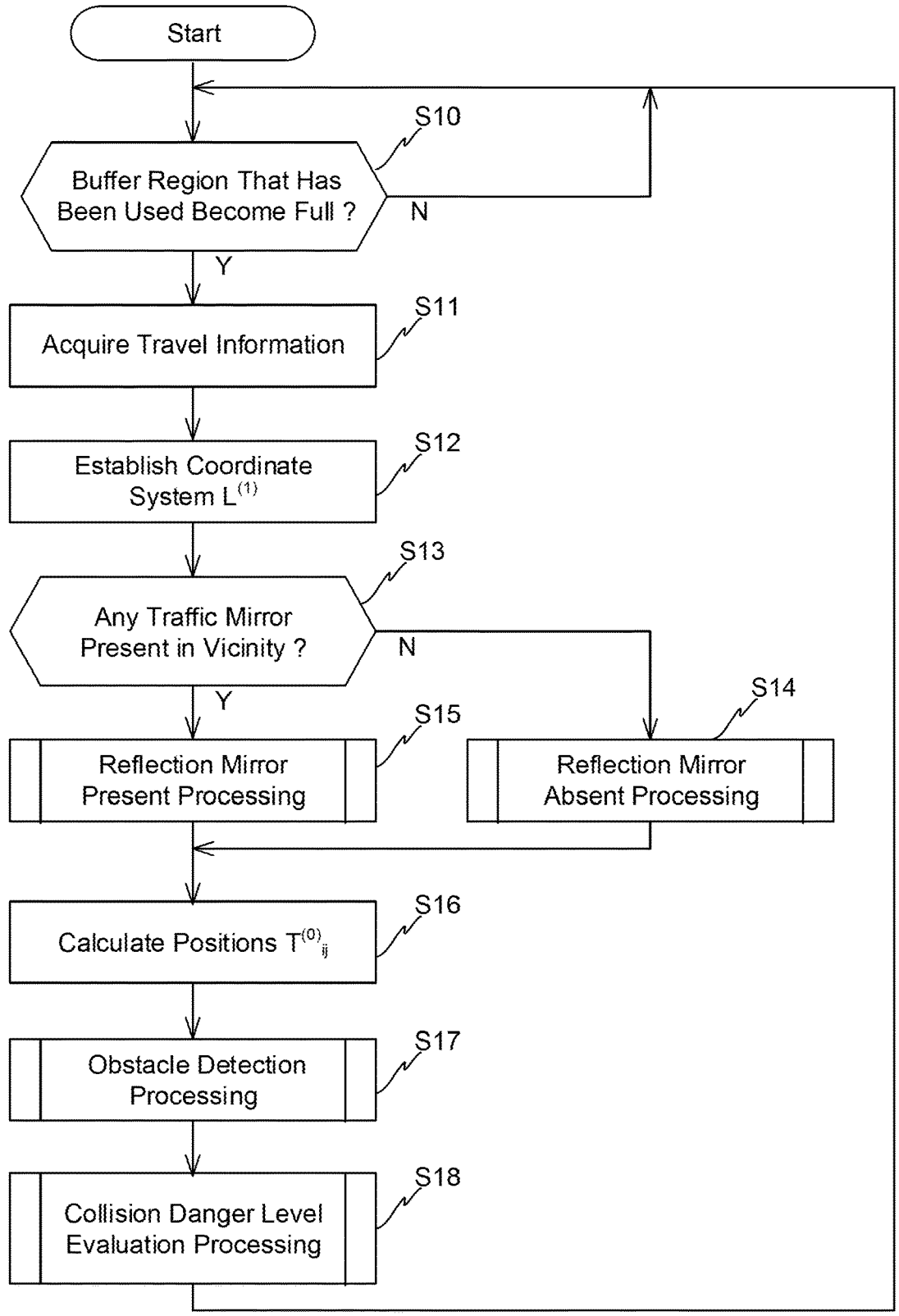
FIG. 13 is a flow chart for explanation of driving assistance processing performed by a processing unit of FIG. 12.

In the driving assistance processing, as shown in FIG. 13, first, in a step S10, the processing unit 110 makes a decision as to whether or not the buffering region that has been used for buffering up until the present moment has become full. If the result of the decision in the step S10 is negative (N in the step S10), then the processing of the step S10 is repeated.

But if the result of the decision in the step S10 is affirmative (Y in the step S10), then the flow of control proceeds to a step S11.

And then, while referring to the information in the storage unit 120 in an appropriate manner, the processing unit 110 performs the processing of the following steps S11 through S18 on the basis of the optical path lengths $r_{ij}$ that are stored in the buffer region that was used for buffering until the present moment (hereinafter this will be referred to as the "selected buffer region").

In the step S11, the processing unit 110 reads in the mounting position information, the current position of the vehicle CR, its direction of traveling, and the road gradient information from the storage unit 120. Subsequently, in the next step S12, the processing unit 110 establishes the coordinate system $L^{(1)}$ described above on the basis of the current position of the vehicle CR, its direction of traveling, and the road gradient information that have thus been read in.

Next, in the next step S13, the processing unit 110 refers to the traffic mirror information in the storage unit 120, and makes a decision as to whether or not any traffic mirror is present in the vicinity of the vehicle CR. If the result of the determination in the step S13 is negative (N in the step S13), then the flow of control proceeds to a step S14.

In the step S14, the processing unit 110 performs reflection mirror absent processing which will be described hereinafter, and calculates on-object reflection positions $T^{(1)}_{ij}$ in the coordinate system $L^{(1)}$. When the reflection mirror absent processing is completed, the flow of control is transferred to a step S16 which will be described hereinafter.

But if the result of the determination in the step S13 is affirmative (Y in the step S13), then the flow of control is transferred to a step S15. In the step S15, the processing unit 110 performs reflection mirror present processing which will be described hereinafter, and calculates on-object reflection positions $T^{(1)}_{ij}$ in the coordinate system $L^{(1)}$. When the reflection mirror present processing is completed, the flow of control proceeds to a step S16.

In the step S16, the processing unit 110 converts the on-object reflection positions $T^{(1)}_{ij}$ to on-object reflection positions $T^{(0)}_{ij}$ in the map coordinate system $L^{(0)}$. And then, the flow of control proceeds to a step S17.

In the step S17, on the basis of the on-object reflection positions $T^{(1)}_{ij}$, the processing unit 110 performs obstacle detection processing that will be described hereinafter. Subsequently, in a step S18, the processing unit 110 performs evaluation processing for the levels of danger of collision between obstacle(s) that have been classified in the step S17 as being moving obstacles and the vehicle CR.

When the processing of the step S18 has been completed, the flow of control returns to the step S10. And then, the processing of the steps S10 through S18 is repeated.

<The Reflection Mirror Absent Processing in the Step S14>

Next, the reflection mirror absent processing in the step S14 will be explained.

Figure 14:
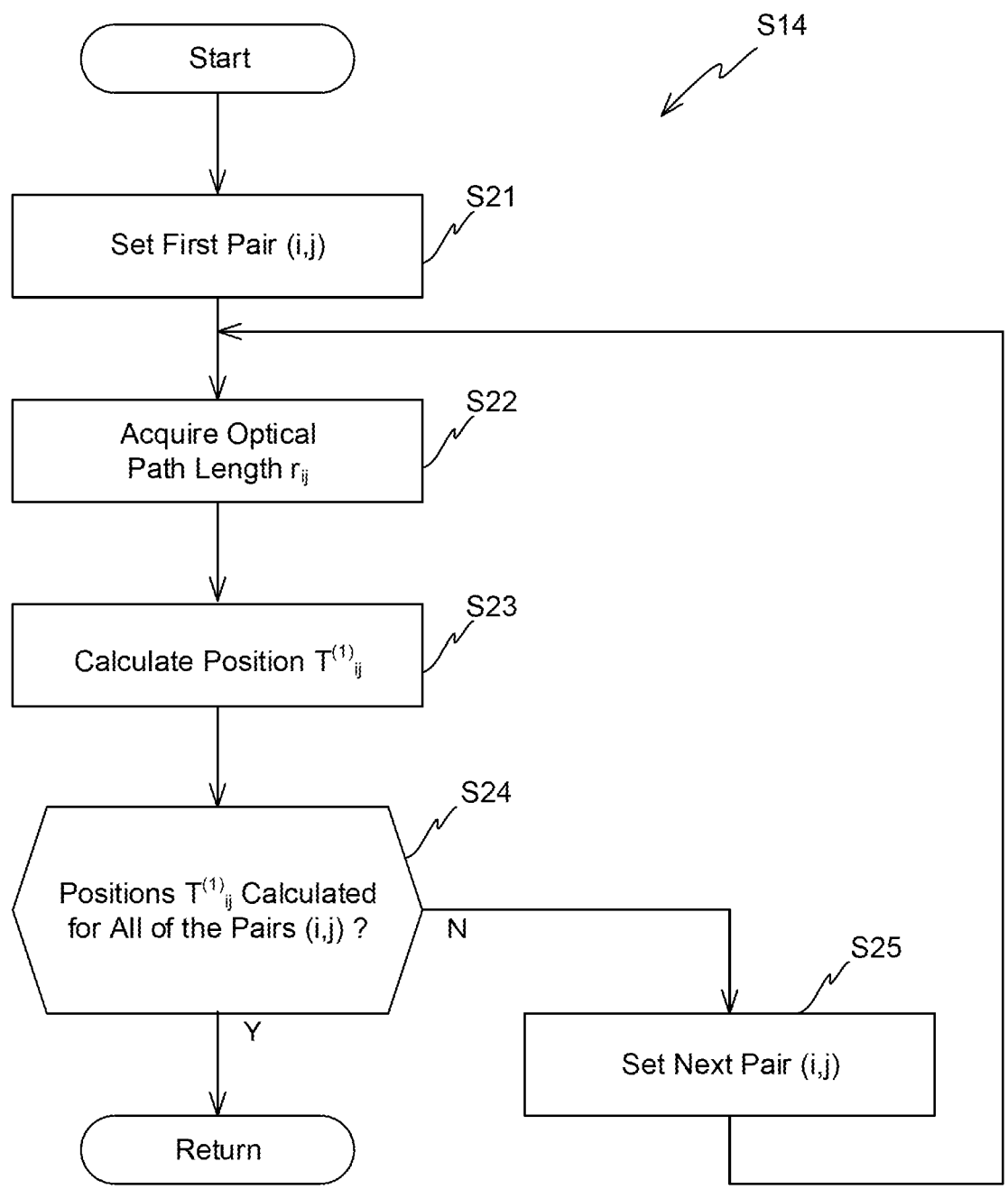
FIG. 14 is a flow chart for explanation of reflection mirror absent processing in FIG. 13.

During the reflection mirror absent processing, as shown in FIG. 14, first, in a step S21, the processing unit 110 sets the first pair (i,j). Subsequently, in a step S22, the processing unit 110 acquires the optical path length $r_{ij}$ corresponding to the pair (i,j) from the selected buffer region in the storage unit 120. And then, in a step S23, the processing unit 110 calculates the on-object reflection position $T^{(1)}_{ij}$ corresponding to the optical path length $r_{ij}$ by using Equations (19) through (23) described above.

Next, in a step S24, the processing unit 110 makes a decision as to whether or not on-object reflection positions $T^{(1)}_{ij}$ have been calculated for all of the pairs (i,j). If the result of the decision in the step S24 is negative (N in the step S24), then the flow of control proceeds to a step S25.

In the step S25, the processing unit 110 sets the next pair (i,j).

Then, the flow of control returns to the step S22. And then, the processing of the steps S22 through S25 is repeated, until the result of the decision in the step S24 becomes affirmative.

When the on-object reflection positions $T^{(1)}_{ij}$ have been calculated for all of the pairs (i,j) and the result of the decision in the step S24 becomes affirmative (Y in the step S24), then the processing of the step S14 terminates. And then, the flow of control proceeds to FIG. 13 described above.

<The Reflection Mirror Present Processing in the Step S15>

Next, the reflection mirror present processing in the step S15 will be explained. Note that, in the following, an example will be described and explained in which only a single traffic mirror LM is present in the vicinity of the vehicle CR.

Figure 15:
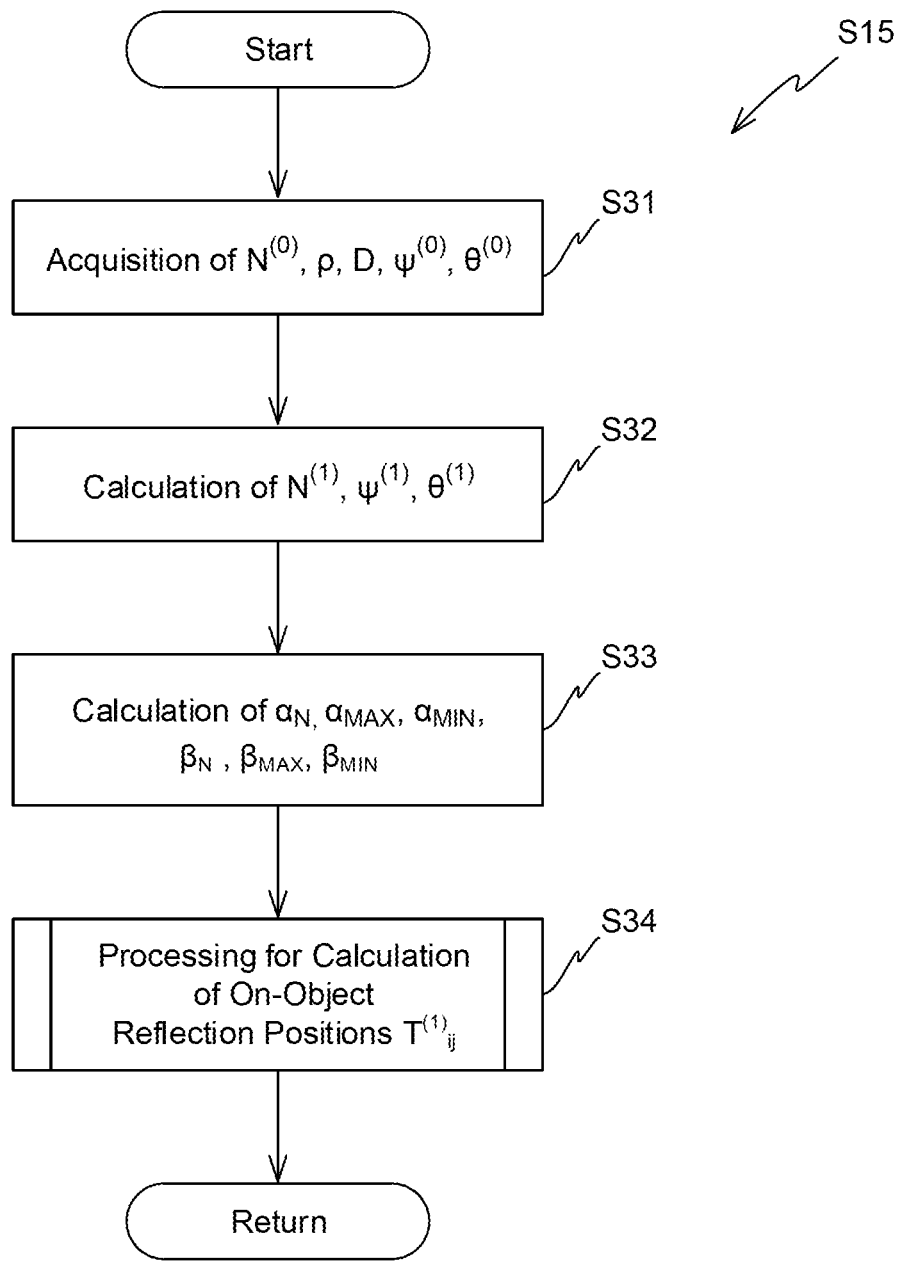
FIG. 15 is a flow chart for explanation of reflection mirror present processing in FIG. 13.

During the reflection mirror present processing, as shown in FIG. 15, first, in a step S31, the processing unit 110 acquires the center position $N^{(0)}$ of the traffic mirror LM in the map coordinate system $L^{(0)}$, its reflection azimuth angle $\psi^{(0)}$ and its reflection depression angle $\theta^{(0)}$, and its radius of curvature $\rho$ and its mirror diameter D from within the storage unit 120. Subsequently, in a step S32, the processing unit 110 converts the center position $N^{(0)}$, the reflection azimuth angle $\psi^{(0)}$, and the reflection depression angle $\theta^{(0)}$ into the center position $N^{(1)}$, the reflection azimuth angle $\psi^{(1)}$, and the reflection depression angle $\theta^{(1)}$ in the coordinate system $L^{(1)}$.

Next, in a step S33, by using Equations (36) through (41) described above, the processing unit 110 calculates the minimum reflection azimuth angle $\alpha_{MIN}$, the center reflection azimuth angle $\alpha_N$ and the maximum reflection azimuth angle $\alpha_{MAX}$, and the minimum reflection depression angle $\beta_{MIN}$, the center depression azimuth angle $\beta_N$ and the maximum reflection depression angle $\beta_{MAX}$. Subsequently, in the next step S34, the processing unit 110 performs processing which will be described hereinafter for calculation of the on-object reflection positions $T^{(1)}_{ij}$.

When the processing of the step S34 is completed, the processing of the step S15 terminates. And then, the flow of control proceeds to the step S16 of FIG. 13.

<The Calculation Processing in the Step S34 for the On-Object Reflection Positions $T^{(1)}_{ij}$>

Next, the processing performed in the step S34 for calculation of the on-object reflection positions $T^{(1)}_{ij}$ will be explained.

Figure 16:
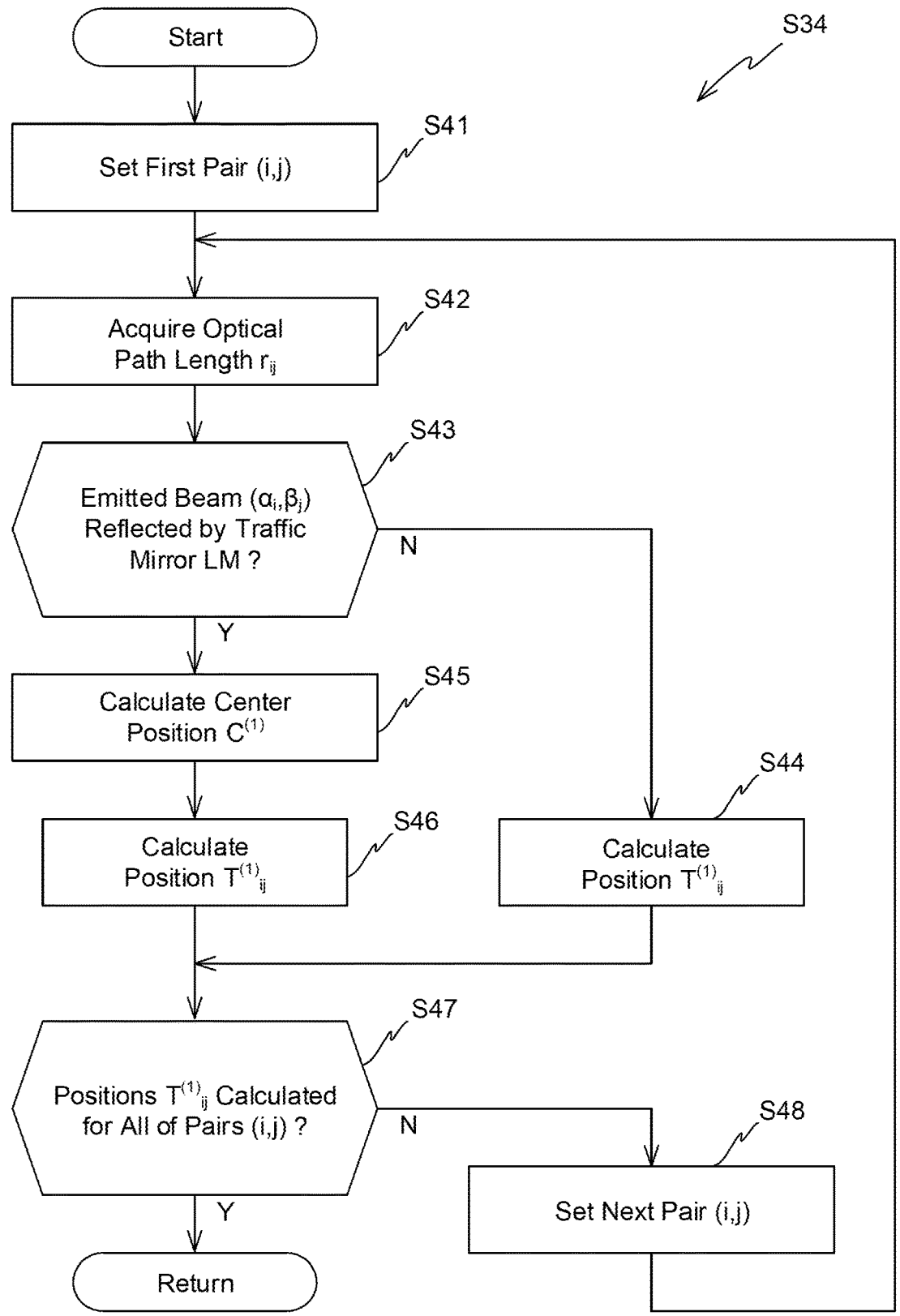
FIG. 16 is a flow chart for explanation of processing for calculation of an on-object reflection position $T^{(1)}$ in FIG. 15.

During the process of calculating the on-object reflection positions $T^{(1)}_{ij}$ in the step S34, as shown in FIG. 16, first, in a step S41, the processing unit 110 sets the first pair (i,j). Subsequently, in a step S42, the processing unit 110 acquires the optical path length $r_{ij}$ corresponding to the pair (i,j) from the selected buffer region in the storage unit 120.

Next, in a step S43, the processing unit 110 makes a decision, according to whether the condition of the Equation (42) described above is satisfied or not, as to whether or not the emitted beam that is emitted in the direction of emission $(\alpha_i, \beta_j)$ is reflected by the traffic mirror LM. If the result of the decision in the step S43 is negative (N in the step S43), then the flow of control proceeds to a step S44.

In the step S44, using Equations (19) through (21), the processing unit 110 calculates the on-object reflection position $T^{(1)}_{ij}$ corresponding to the optical path length $r_{ij}$. And then, the flow of control is transferred to a step S47 which will be described hereinafter.

But if the result of the decision in the step S43 is affirmative (Y in the step S43), then the flow of control is transferred to a step S45. In the step S45, the processing unit 110 calculates the mirror center position $C^{(1)}$ in the coordinate system $L^{(1)}$.

Next, in a step S46, using Equation (18) described above, the processing unit 110 calculates the on-object reflection position $T^{(1)}_{ij}$ corresponding to the optical path length $r_{ij}$. And then, the flow of control proceeds to the step S47.

In the step S47, the processing unit 110 makes a decision as to whether or not the on-object reflection positions $T^{(1)}_{ij}$ have been calculated for all of the pairs (i,j). If the result of the decision in the step S47 is negative (N in the step S47), then the flow of control proceeds to a step S48.

In the step S48, the processing unit 110 sets the next pair (i,j).

Then, the flow of control returns to the step S42. And then, the processing of the steps S42 through S48 is repeated until the result of the decision in the step S47 becomes affirmative.

When the object reflection positions $T^{(1)}_{ij}$ have been calculated for all of the pairs (i,j) and the result of the decision in the step S47 becomes affirmative (Y in the step S47), then the processing of the step S15 terminates due to the processing of the step S34 terminating. And then the flow of control proceeds to the step S16 of FIG. 13.

Note that, if a plurality of traffic mirrors are present in the vicinity of the vehicle CR, then similar processing to that of the step S15 described above is performed while deciding whether or not the emitted beam that is emitted in the direction of emission $(\alpha_i, \beta_j)$ is reflected by any one of that plurality of traffic mirrors.

<The Obstacle Detection Processing in the Step S17>

Next, the obstacle detection processing in the step S17 will be explained.

Figure 17:
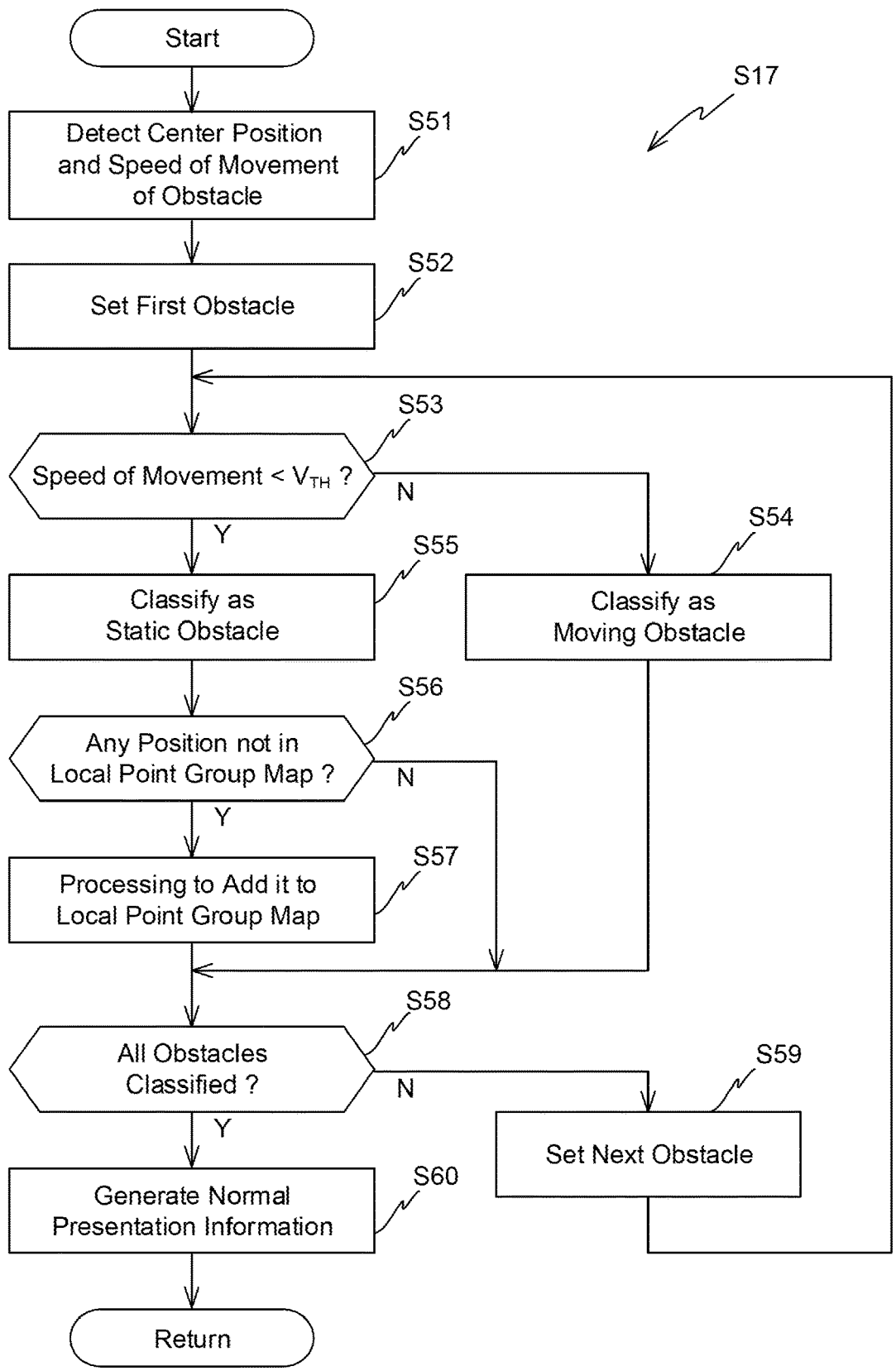
FIG. 17 is a flow chart for explanation of obstacle detection processing in FIG. 13.

During the obstacle detection processing, as shown in FIG. 17, first, in a step S51, along with detecting an obstacle, the processing unit 110 also detects the center position and the speed of movement of the detected obstacle. In the detection, first, the processing unit 110 eliminates, from among the on-object reflection positions $T^{(0)}_{ij}$, those positions in the coordinate system $L^{(0)}$ that correspond to on-object reflection positions that are estimated, from the on-object reflection positions $T^{(1)}_{ij}$, to be upon the road surface and that satisfy the condition of Equation (43). Subsequently, from among the point groups, which are sets of position points among the on-object reflection positions $T^{(1)}_{ij}$, the processing unit 110 eliminates position points that are already registered within the storage unit 120 as being local point group map information, and thereby extracts a new obstacle position point group.

Next, the processing unit 110 performs clustering processing upon the point groups of the obstacle positions that have thus been extracted, and, along with detecting obstacles, also detects their center positions. Subsequently, the processing unit 110 refers to the results of the most recent clustering processing, and detects the speeds of movement and the moving directions of the detected obstacles.

When the processing of the step S51 has been completed in this manner, the flow of control proceeds to a step S52. In the step S52, the processing unit 110 sets the first obstacle that is to be the subject of the processing of the following steps S53 through S57.

Next, in the step S53, the processing unit 110 makes a decision as to whether or not the speed of movement of the obstacle is less than a predetermined speed $V_{TH}$. Here, the "predetermined speed $V_{TH}$" may be determined in advance on the basis of experiment, simulation, experience or the like, from the standpoint of determining whether or not the obstacle is stationary.

If the result of the decision in the step S53 is negative (N in the step S53), then the flow of control proceeds to a step S54. In the step S54, the obstacle is classified as being a moving obstacle. And then the flow of control is transferred to a step S58 which will be described hereinafter.

But if the result of the decision in the step S53 is affirmative (Y in the step S53), then the flow of control is transferred to a step S55. In the step S55, the obstacle is classified as being a static obstacle.

Then, in a step S56, the processing unit 110 makes a decision as to whether or not, among the point groups for positions of reflected objects that are static obstacles, there is any point that does not belong to the local point group map information (LPGM). If the result of the decision in the step S56 is negative (N in the step S56), then the flow of control is transferred to the step S58.

But if the result of the decision in the step S56 is affirmative (Y in the step S56), then the flow of control proceeds to the step S57. In the step S57, the processing unit 110 adds the point group for the reflected object that is a static obstacle and that is not included in the local point group map information, to the local point group map information. Then, the flow of control continues to the step S58.

In the step S58, the processing unit makes a decision as to whether or not all of the obstacles that were detected and identified have been classified as being either static obstacles or moving obstacles. If the result of the decision in the step S58 is negative (N in the step S58), then the flow of control proceeds to a step S59.

In the step S59, the processing unit 110 sets another obstacle to be the next subject of the processing of the steps S53 through S57. Subsequently, the flow of control returns to the step S53. And then, the processing of the steps S53 through S59 is repeated, until the result of the decision in the step S58 becomes affirmative.

When all of the obstacles that were detected and identified have been classified as being either static obstacles or as being moving obstacles and the result of the decision in the step S58 becomes affirmative (Y in the step S58), then the flow of control is transferred to a step S60. In the step S60, on the basis of the current position of the vehicle CR, its direction of traveling and its traveling speed, the center position(s) of moving obstacle(s) and their moving directions and their speeds of movement, and the general map information and the local point group map information, the processing unit 110 generates display data in order to display normal presentation information upon the display unit 256. And the processing unit 110 sends the display data that it has thus generated to the display unit 256. As a result, normal presentation information that includes the current position of the vehicle CR, its direction of traveling and its traveling speed, the center position(s) of moving obstacle(s) and their moving directions and their speeds of movement, and the local point group map information is displayed upon the display unit 256.

When the processing of the step S60 has been completed, the processing of the step S17 terminates. And then, the flow of control then proceeds to the step S18 of FIG. 13 described above.

<The Processing in the Step S18 for Evaluation of the Collision Danger Level>

Next, the processing in the step S18 for evaluation of the collision danger level will be explained.

Figure 18:
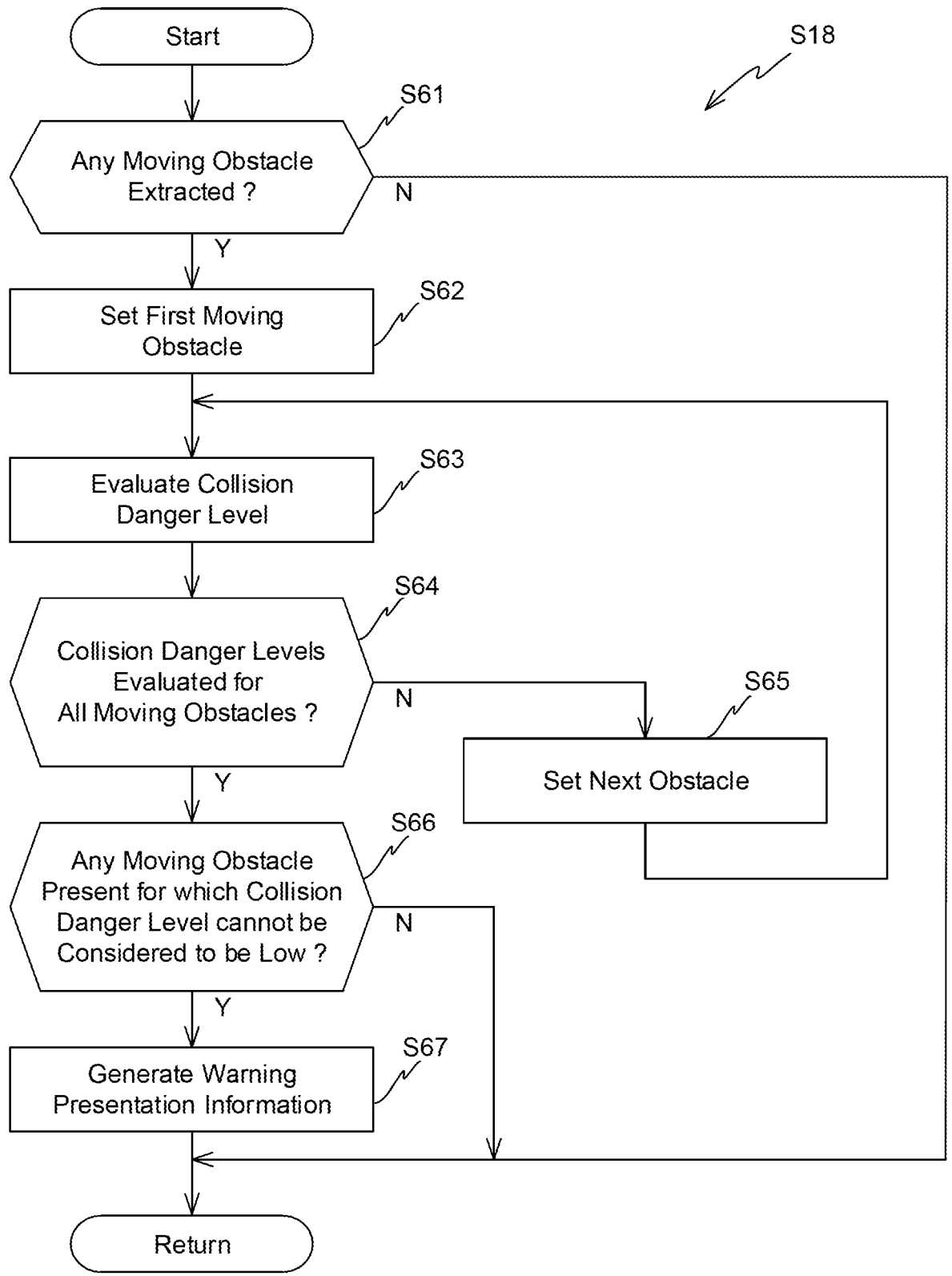
FIG. 18 is a flow chart for explanation of collision danger level evaluation processing in FIG. 13.

During the processing for evaluation of the collision danger level, as shown in FIG. 18, first, in a step S61, the processing unit 110 makes a decision as to whether or not there is any obstacle that has been classified as being a moving obstacle. If the result of the decision in the step S61 is negative (N in the step S61), then the processing of the step S18 terminates. And then, the flow of control returns to the step S10 of FIG. 13, described above.

But if the result of the decision in the step S61 is affirmative (Y in the step S61), then the flow of control proceeds to a step S62. In the step S62, the processing unit 110 sets the first moving obstacle to be the subject of the processing of the following step S63.

In the next step S63, on the basis of the current position of the vehicle CR, its traveling direction, its traveling speed and its planned travel path, and the center position of the moving obstacle, its direction of moving, and its speed of movement, the processing unit 110 evaluates the level of danger of a collision between the vehicle CR and the moving obstacle. Then, the flow of control proceeds to a step S64.

In the step S64, the processing unit 110 makes a decision as to whether or not the collision danger levels have been evaluated for all of the moving obstacles. If the result of the decision in the step S64 is negative (N in the step S64), then the flow of control proceeds to a step S65.

In the step S65, the processing unit 110 sets the next moving obstacle to be the subject of processing in the step S63. Then, the flow of control returns to the step S63. And then, the processing of the steps S63 through S65 is repeated, until the result of the decision in the step S64 becomes affirmative.

When the collision danger level has been evaluated for all of the moving obstacles and the result of the decision in the step S64 becomes affirmative (Y in the step S64), then the flow of control is transferred to a step S66. In the step S66, the processing unit 110 makes a decision as to whether or not there is some moving obstacle for which it cannot be said that the collision danger level is low.

If the result of the determination in the step S66 is negative (N in the step S66), then the processing of the step S18 terminates. And then, the flow of control returns to the step S10 of FIG. 13.

But if the result of the determination in the step S66 is affirmative (Y in the step S66), then the flow of control proceeds to a step S67. In the step S67, the processing unit 110 generates audio data for outputting warning presentation information to the sound output unit 251 in order to present the fact that there is a danger of collision. And then the processing unit 110 sends the audio data that has thus been generated to the sound output unit 251. As a result, audio is outputted from the sound output unit 251 detecting that there is a danger of collision between the vehicle CR and a moving obstacle.

When the processing of the step S67 has been completed, the processing of the step S18 terminates. And then the flow of control returns to the step S10 of FIG. 13.

Note that examples are shown in FIG. 19(B) of presentation of normal presentation information when, as shown in FIG. 19(A), a traffic mirror LM, static obstacles SOB1 through SOB3, and a moving obstacle DOB are present in the vicinity of the vehicle CR. FIG. 19(B) shows examples of presentation of normal presentation information at a time point $t_1$, at a time point $t_2$ ($>t_1$), and at a time point $t_3$ ($>t_2$).

Note that, in FIG. 19(B), the current position of the vehicle CR is indicated by "○", while the on-object reflection positions for the static obstacles SOB1 through SOB3 in the local point group map information and the on-object reflection position for the moving obstacle DOB are indicated by "•". Here, the on-object reflection position of the moving obstacle DOB is surrounded by an elliptical dotted line frame. Moreover, the direction of traveling and the traveling speed of the vehicle CR are shown by the direction and the length of an arrow sign whose starting point is the sign "○". Furthermore, the direction of moving and the speed of movement of the moving obstacle DOB are shown by the direction and the length of an arrow sign whose starting point is the elliptical dotted line frame.

As has been explained above, according to the example, similar beneficial effects may be obtained to those in the case of the embodiment described above.

Modification of the Example

Modifications similar to those in the case of the embodiment described above may be implemented for the example described above as well.

Furthermore, in the example described above, the presentation to the user of the warning presentation information was performed only via audio. By contrast, it would also be acceptable to arrange to perform visual presentation of an accentuated display of a moving obstacle with which there is a danger of collision, instead of providing that presentation via audio, or in addition to presenting it via audio.

Moreover, it would also be acceptable to arrange to present the normal presentation information in some other manner, instead of via the example display shown in FIG. 19(B).

The invention claimed is:

1. A driving assistance device comprising:
a first acquisition unit that acquires information about the surroundings of a moving body by using light emitted from a laser radar mounted to the moving body;
a second acquisition unit that acquires traffic mirror information that includes position information for a traffic mirror installed on a road;
a third acquisition unit that acquires position information for said moving body; and
an extraction unit that, on the basis of the results of acquisition by using said second acquisition unit and by using said third acquisition unit, specifies a positional relationship between said moving body and said traffic mirror, and extracts information about the surroundings acquired via said traffic mirror from among the results of acquisition by using said first acquisition unit, the information about the surroundings acquired via said traffic mirror being obtained using a part of light emitted from said laser radar and returning to the laser radar via said traffic mirror after reflection off an object.

2. The driving assistance device according to claim 1, wherein, a radius of curvature, a diameter of said traffic mirror, an azimuth angle of installation, and a depression angle of installation are further included in said traffic mirror information.

3. The driving assistance device according to claim 1, wherein, position information for said laser radar on said moving body is included in said position information for said moving body.

4. The driving assistance device according to claim 1, wherein the object is an obstacle to moving of said moving body, and
further comprising:
a recognition unit that, on the basis of the result of extraction by said extraction unit and map information, detects the obstacle to moving of said moving body, said obstacle being not included in said map information.

5. The driving assistance device according to claim 4, wherein,
said recognition unit identifies said detected obstacle and classifies said detected obstacle into either a static obstacle or a moving obstacle.

6. The driving assistance device according to claim 5, wherein,
said recognition unit adds information for said static obstacle to said map information.

7. The driving assistance device according to claim 5, further comprising:
a fourth acquisition unit that acquires the direction of traveling, the traveling speed, and the planned travel path of said moving body; and wherein,
said recognition unit detects a center position, traveling direction, and speed of movement of said moving obstacle, and evaluates the level of danger of collision between said moving body and said moving obstacle on the basis of said center position, said traveling direction, and said speed of movement that have been detected, and the results of acquisition by said fourth acquisition unit.

8. A driving assistance method utilized by a driving assistance device that uses a laser radar mounted to a moving body, and that assists traveling of said moving body, comprising the steps of:
acquiring information about the surroundings of said moving body acquired by using light emitted from said laser radar, traffic mirror information that includes position information for a traffic mirror installed on a road, and position information for said moving body;
specifying a positional relationship between said moving body and said traffic mirror, on the basis of said traffic mirror information and said position information for said moving body acquired in said acquiring step; and
extracting information about the surroundings acquired via said traffic mirror from among information about the surroundings of said moving body acquired by said acquiring step, on the basis of said positional relationship, the information about the surroundings acquired via said traffic mirror being obtained using a part of light emitted from said laser radar and returning to the laser radar via said traffic mirror after reflection off an object.

9. A non-transient computer readable medium having recorded therein a driving assistance program that, when executed, causes a calculation part to execute the driving assistance method according to claim 8.

10. A driving assistance device comprising:
a first acquisition unit that acquires information about the surroundings of a moving body by using a laser radar mounted to the moving body;
a second acquisition unit that acquires traffic mirror information that includes position information for a traffic mirror installed on a road;
a third acquisition unit that acquires position information for said moving body; and
a calculation unit that, i) on the basis of the results of acquisition by using said second acquisition unit and by using said third acquisition unit, specifies a positional relationship between said moving body and said traffic mirror, and ii) from results of acquisition from said first acquisition unit, the calculation unit calculates information of a position of an object irradiated by light emitted by said laser radar, the information of the position of the object being calculated using a part of the light being emitted from said laser radar and returning to the laser radar after being reflected by said traffic mirror and the object.

* * * * *